US010795445B2

(12) United States Patent
Keller et al.

(10) Patent No.: US 10,795,445 B2
(45) Date of Patent: Oct. 6, 2020

(54) METHODS, DEVICES, AND SYSTEMS FOR DETERMINING CONTACT ON A USER OF A VIRTUAL REALITY AND/OR AUGMENTED REALITY DEVICE

(71) Applicant: FACEBOOK TECHNOLOGIES, LLC, Menlo Park, CA (US)

(72) Inventors: Sean Jason Keller, Bellevue, WA (US); Tristan Thomas Trutna, Seattle, WA (US); Hrvoje Benko, Seattle, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/241,890

(22) Filed: Jan. 7, 2019

(65) Prior Publication Data
US 2019/0212822 A1    Jul. 11, 2019

Related U.S. Application Data

(60) Provisional application No. 62/647,559, filed on Mar. 23, 2018, provisional application No. 62/647,560, filed on Mar. 23, 2018.

(51) Int. Cl.
*G09G 5/00* (2006.01)
*G06F 3/01* (2006.01)
(Continued)

(52) U.S. Cl.
CPC .............. *G06F 3/016* (2013.01); *G06F 1/163* (2013.01); *G06F 3/011* (2013.01); *G06F 3/014* (2013.01);
(Continued)

(58) Field of Classification Search
CPC .......... G06F 3/016; G06F 3/014; G06F 3/011; G06F 1/163; G06F 3/017; G06F 3/015;
(Continued)

(56) References Cited

U.S. PATENT DOCUMENTS 9,797,691 B1    10/2017 Hunn et al.
2008/0009764 A1    1/2008 Davies
(Continued)

FOREIGN PATENT DOCUMENTS

WO   WO2015-102464 A1   7/2015
WO   WO2015127116 A1    8/2015
WO   WO2015-199898 A1   12/2015

OTHER PUBLICATIONS

Da-Chen Pang et al., A Transparent Capacitive Micromachined Ultrasonic Transducer (CMUT) Array for Finger Hover-Sensing Dial Pads, 2017 19th International Conference on Solid-State Sensors, Actuators and Microsystems (TRANSDUCERS), Kaohsiung, Taiwan: IEEE, Jun. 18-22, 2017, pp. 2171-2174, 4 pgs.

(Continued)

*Primary Examiner* — Adam R. Giesy
(74) *Attorney, Agent, or Firm* — Morgan, Lewis & Bockius LLP

(57) ABSTRACT

A method of determining contact on a user of a virtual reality and/or augmented reality device includes a first device including a plurality of transducers and a control circuit coupled to the plurality of transducers. The method includes activating one or more of the first plurality of transducers and generating waves that couple into at least a portion of a first appendage of a user wearing the first wearable device. The method further includes at a second wearable device having a second plurality of transducers, receiving at least a portion of the waves generated by the first plurality of transducers when the first appendage of the user is within a threshold distance from the second wearable device. The user is wearing the second wearable device on a second appendage different from the first appendage and in response to receiving the portion of the waves, providing a signal corresponding to the received portion of the waves to a (Continued)

computing device that uses the signal to determine a position of the first appendage with respect to a position of the second wearable device.

20 Claims, 14 Drawing Sheets

(51) Int. Cl.
  *G06F 1/16* (2006.01)
  *G06K 19/077* (2006.01)
  *G06T 19/00* (2011.01)
(52) U.S. Cl.
  CPC .............. *G06F 3/015* (2013.01); *G06F 3/017* (2013.01); *G06K 19/07762* (2013.01); *G06T 19/006* (2013.01)
(58) Field of Classification Search
  CPC ....... G06F 3/012; G06F 3/013; G06T 19/006; G06K 19/07762
  See application file for complete search history.

(56) References Cited

U.S. PATENT DOCUMENTS

| | | | |
|---|---|---|---|
| 2014/0125571 A1 | 5/2014 | Um et al. | |
| 2015/0317885 A1 | 11/2015 | Ramstein et al. | |
| 2016/0019762 A1 | 1/2016 | Levesque et al. | |
| 2016/0094936 A1* | 3/2016 | Yang .................... | G06F 1/1694 455/456.1 |
| 2016/0100034 A1 | 4/2016 | Miller | |
| 2016/0357261 A1 | 12/2016 | Bristol et al. | |
| 2017/0097753 A1 | 4/2017 | Bailey et al. | |
| 2017/0102771 A1 | 4/2017 | Lei | |
| 2017/0115733 A1 | 4/2017 | Du | |
| 2017/0123487 A1 | 5/2017 | Hazra et al. | |
| 2017/0220005 A1 | 8/2017 | Han et al. | |

OTHER PUBLICATIONS

FaceBook Technologies, LLC, International Search Report and Written Opinion, PCT/US2019/012697, dated Apr. 29, 2019, 10 pgs.
FaceBook Technologies, LLC, International Search Report and Written Opinion, PCT/US2019/012702, dated Apr. 29, 2019, 11 pgs.
FaceBook Technologies, LLC, International Search Report and Written Opinion, PCT/US2019/012718, dated May 3, 2019, 10 pgs.
FaceBook Technologies, LLC, International Search Report and Written Opinion, PCT/US2019/012721, dated Apr. 29, 2019, 10 pgs.
Keller, Office Action, U.S. Appl. No. 16/241,871, dated Oct. 30, 2019, 14 pgs.
Keller, Notice of Allowance, U.S. Appl. No. 16/241,871, dated Feb. 28, 2020, 8 pgs.
Keller, Notice of Allowance, U.S. Appl. No. 16/241,900, dated Feb. 21, 2020, 11 pgs.
Zhang, "SkinTrack: Using the Body as an Electrical Waveguide for Continuous Finger Tracking on the Skin," 0 2016 ACM, ISBN978-1-4503-3362-7/16/05, 13 pgs.

* cited by examiner

1000

| At a first wearable device comprising a plurality of transducers that can each generate one or more singals that propagate away from the wearable device through a medium |
|---|
| Receive, via a radio of the first wearable device, an instruction from a host 1002     Receive an input at the first wearable device 1004 |
| The first wearable device is configured to receive one or more signals 1006 |
| The first wearable is to be worn on the user's first appendage where the first appendage is the user's dominant appendage 1008 |

▼

Determine that the first appendage is in a transmitting position 1012

The transmitting position is one of a plurality of predetermined transmitting positions and corresponds to a hand pose of the first appendage 1014

▼

| Activate one or more of the first plurality of transducers 1016 |
|---|
| The plurality of transducers is a plurality of electrodes 1018 |
| Activate the one or more transducers in response to determining that the first appendage is in the transmitting position 1020 |
| Activate the one or more transducers in response to receiving the instruction from the host 1021 |
| Activate the one or more transducers in response to receiving the input 1022 |

▼

| Generate signals that vibrate into at least a portion of a first appendage of a user wearing the first wearable device 1024 |
|---|
| The signals are transmitted through the skin of the user 1026 |
| The signals are transmitted through bones of the user 1028 |
| The signals are transmitted through the first appendage of the user 1030 |
| The signals are ultrasonic waves 1032 |

```
┌─────────────────────────────────────────────────────────────────────────┐
│ At a second wearable device having a second plurality of transducers, receive at │
│ least a portion of the signals generated by the first plurality of transducers when the │
│ first appendage of the user is within a threshold distance from the second wearable │
│ device when the user is wearing the second wearable device on a second │
│ appendage different from the first appendage 1034 │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│   │ Generate different signals that vibrate at least a portion of the second │   │
│   │   appendage of the user wearing the second wearable device 1036   │   │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│                                                                         │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│   │ Receive the portion of signals through at least a portion of the second │   │
│   │                    appendage of the user 1038                      │   │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│                                                                         │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│   │ The second wearable is to be worn on the user's second appendage where │   │
│   │    the second appendage is the user's recessive appendage 1040     │   │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│                                                                         │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│   │ Send a message to a remote device identifying the position of the portion of │   │
│   │   the first appendage. A head-mounted display in communication with the   │   │
│   │  remote device uses the information to display at least the portion of the first  │   │
│   │         appendage in virtual and/or augmented reality 1042         │   │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
└─────────────────────────────────────────────────────────────────────────┘

┌─────────────────────────────────────────────────────────────────────────┐
│ Provide data corresponding to the received portion of the signals to a computing │
│  system that uses the data to determine a position of the first appendage with │
│       respect to a position of the second wearable device 1044          │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│   │  The data corresponding to the received portion of the signals includes an   │   │
│   │  indication that the position of the portion of the first appendage is a hand-  │   │
│   │         hover proximate to the second wearable device 1046         │   │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│   │  The data corresponding to the received portion of the signals includes an   │   │
│   │ indication that the position of the portion of the first appendage is a fingertip- │   │
│   │         hover proximate to the second wearable device 1048         │   │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│   │  The data corresponding to the received portion of the singals includes an   │   │
│   │  indication that the position of the portion of the first appendage is in contact   │   │
│   │     with skin of the user proximate to the second wearable device 1050     │   │
│   │   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │   │
│   │   │            The contact is a tap gesture 1052                │   │   │
│   │   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │   │
│   │   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │   │
│   │   │           The contact is a swipe gesture 1054               │   │   │
│   │   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │   │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
└─────────────────────────────────────────────────────────────────────────┘
```

Figure 10B

METHODS, DEVICES, AND SYSTEMS FOR DETERMINING CONTACT ON A USER OF A VIRTUAL REALITY AND/OR AUGMENTED REALITY DEVICE

RELATED FIELD

This application claims priority to U.S. Provisional Application No. 62/647,559, filed Mar. 23, 2018, entitled "Methods, Devices, and Systems for Determining Contact On a User of a Virtual Reality and/or Augmented Reality Device" and U.S. Provisional Application No. 62/647,560, filed Mar. 23, 2018, entitled "Methods, Devices, and Systems for Projecting an Image Onto a User and Detecting Touch Gestures" each of which is incorporated by reference herein in its entirety.

This application is related to U.S. Utility patent application Ser. No. 16/241,893, entitled "Methods, Devices, and Systems for Displaying a User Interface on a User and Detecting Touch Gestures," filed Jan. 7, 2019, which is incorporated by reference herein in its entirety.

TECHNICAL FIELD

This relates generally to contact sensing, including but not limited to using two wearable devices to enable fine-grained user interactions and reliable contact sensing on a user of a virtual reality and/or augmented reality device.

BACKGROUND

Virtual reality (VR) and/or augmented reality (AR) technologies allow users to interact with technologies in different ways. VR and/or AR allows a user to tactilely interact with the digital world. Users may experience haptic responses from electronic devices, allowing users a rich experience. Wearable devices for VR and/or AR may allow users to interact with the digital world through a medium distinct from an electronic device's screen (e.g., a wearable device projects an image onto a user's forearm). However, determining a location of a gesture in response to the projected image of sufficient magnitude presents a challenge.

Additionally, in order for virtual reality and augmented reality devices to function properly, a position of a user's extremities (e.g., arm, hand, etc.) generally needs to be known. In the past, cameras were used to determine the position of the user's extremities. Cameras, however, cannot adequately capture the intricacies of certain extremities, such as the human hand, especially when a full image of the human hand cannot be captured. As a result, challenges still exist with determining a position/pose of certain extremities (e.g., a pose of the user hand) and whether a user has made contact with its own skin or is within the general vicinity of the skin.

SUMMARY

Accordingly, there is a need for methods, devices, and systems for detecting contact information on a user having sufficient accuracy in placement and duration. One solution is to generate multiple signals (e.g., ultrasonic waves, electromagnetic waves, high frequency signals, etc.) that traverse on or through the user. These signals/waves can be detected by a receiver device to determine whether a contact gesture is imminent, has been made, or is occurring and/or a hover gesture is imminent, has been made, or is occurring.

(A1) In accordance with some embodiments, a method is performed at a first wearable device having a first plurality of transducers that can each generate one or more signals and a control circuit coupled to the plurality of transducers. The method includes activating one or more of the first plurality of transducers and generating signals that couple into at least a portion of a first appendage of a user wearing the first wearable device. The method is also performed at a second wearable device having a second plurality of transducers. The method includes receiving, by the second plurality of transducers of the second wearable device, at least a portion of the signals generated by the first plurality of transducers when the first appendage of the user is within a threshold distance from the second wearable device. In this example embodiment, the user is wearing the second wearable device on a second appendage different from the first appendage. In response to the receiving of the portion of the signals, the method further includes providing, by the second wearable device, a signal corresponding to the received portion of the signals to a computing device, where the computing device uses the signal to determine a position of the first appendage with respect to a position of the second wearable device.

(A2) In some embodiments of the method of A1, the method further comprises, at the second wearable device, generating, via the second plurality of transducers, different signals that vibrate at least a portion of the second appendage of the user wearing the second wearable device.

(A3) In some embodiments of the method of any of A1-A2, the plurality of transducers is a plurality of electrodes.

(A4) In some embodiments of the method of any of A1-A3, the signals are transmitted through the skin of the user or the bones of the user.

(A5) In some embodiments of the method of any of A1-A4, the portion of signals received by the second plurality of transducers is received through at least a portion of the second appendage of the user.

(A6) In some embodiments of the method of any of A1-A5, the first wearable device is also configured to receive one or more signals.

(A7) In some embodiments of the method of any of A1-A6, the signals are ultrasonic waves.

(A8) In some embodiments of the method of any of A1-A7, the first wearable is to be worn on the user's first appendage, and the first appendage is the user's dominant appendage. Furthermore, the second wearable is to be worn on the user's second appendage, and the second appendage is the user's recessive appendage.

(A9) In some embodiments of the method of any of A1-A8, the data corresponding to the received portion of the signals includes an indication that the position of the portion of the first appendage is a hand-hover proximate to the second wearable device.

(A10) In some embodiments of the method of any of A1-A8, the data corresponding to the received portion of the signals includes an indication that the position of the portion of the first appendage is a fingertip-hover proximate to the second wearable. device.

(A11) In some embodiments of the method of any of A1-A8, the data corresponding to the received portion of the signals includes an indication that the position of the user includes an indication that the user is in contact with skin of the user proximate to the second wearable device.

(A12) In some embodiments of the method of any of A1-A11, further including, receiving, via a radio of the first wearable device, an instruction from the computing device.

Moreover, activating the one or more transducers of the first plurality of transducers is performed in response to receiving the instruction.

(A13) In some embodiments of the method of any of A1-A12, further including determining that the first appendage is in a transmitting position. Moreover, activating the one or more transducers of the first plurality of transducers is performed in response to determining that the first appendage is in the transmitting position.

(A14) In some embodiments of the method of A13, the transmitting position is one of a plurality of predetermined transmitting positions and corresponds to a pose of the first appendage.

(A15) In some embodiments of the method of any of A1-A14, further including receiving an input at the first wearable device. Moreover, activating the one or more transducers of the first plurality of transducers is performed in response to receiving the input.

(A16) In some embodiments of the method of any of A1-A15, a head-mounted display is in communication with the computing device and the head-mounted display uses the position of the first appendage to display at least the portion of the first appendage in virtual and/or augmented reality.

(A17) In some embodiments of the method of any of A1-A16, the first wearable device is a transmitter of one or more signals and the second wearable device is a receiver of the one or more signals.

(A18) In some embodiments of the method of any of A1-A17, the second wearable device is the computing system.

(A19) In some embodiments of the method of any of A1-A17, the first wearable device is the computing system.

In some embodiments, the solution explained above can be implemented on a wearable device that includes a plurality of transducers (e.g., actuators, electrodes, antennae). The wearable device in some instances is worn on the user's body (e.g., wrist, ankle, etc.). Moreover, the wearable device can be in communication with a remote device (e.g., a virtual reality device and/or an augmented reality device, among others), and the wearable device can stimulate the body based on an instruction from the remote device. As an example, the host system may display video data to a user (e.g., may instruct a head-mounted display to display the video data), and the host system may also instruct the wearable device to project images from the video onto the user's body. The wearable device may detect contact with the projected image on the user's body.

The devices, systems, and methods describes herein provide benefits including but not limited to: (i) detecting a touch gesture on a user's skin by an appendage of the user, (ii) determining a location of the touch gesture on the user's skin, (iii), the wearable device does not encumber free motion of a user's hand and/or wrist (or other body parts), and (iv) multiple wearable devices can be used simultaneously.

In some embodiments, the signals are mechanical waves (e.g., soundwaves, ultrasonic waves, etc.). In some embodiments, the signals are RF, capacitive, electromagnetic, or other forms of signals that may propagate through air and/or space. In some embodiments, the wearable device is attached to an appendage (e.g., wrist, finger, forearm, bicep, thigh, ankle, etc.) of the user.

In accordance with some embodiments, a wearable device (or multiple wearable devices) includes one or more processors/cores and memory storing one or more programs configured to be executed by the one or more processors/cores. The one or more programs include instructions for performing the operations of the method described above (A1-A19). In accordance with some embodiments, a non-transitory computer-readable storage medium has stored therein instructions that, when executed by one or more processors/cores of a wearable device, cause the wearable device to perform the operations of the method described above (A1-A19). In accordance with some embodiments, a system includes a wearable device, a head-mounted display (HMD), and a computer system to provide video/audio feed to the HMD and instructions to the wearable device.

In another aspect, a wearable device is provided and the wearable device includes means for performing any of the methods described herein (A1-A19).

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIGS. 10A-10B are flow diagrams illustrating a method of determining contact on a user's body in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first wearable device could be termed a second wearable device, and, similarly, a second wearable device could be termed a first wearable device, without departing from the scope of the various described embodiments. The first wearable device and the second wearable device are both wearable devices, but they are not the same wearable devices, unless specified otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
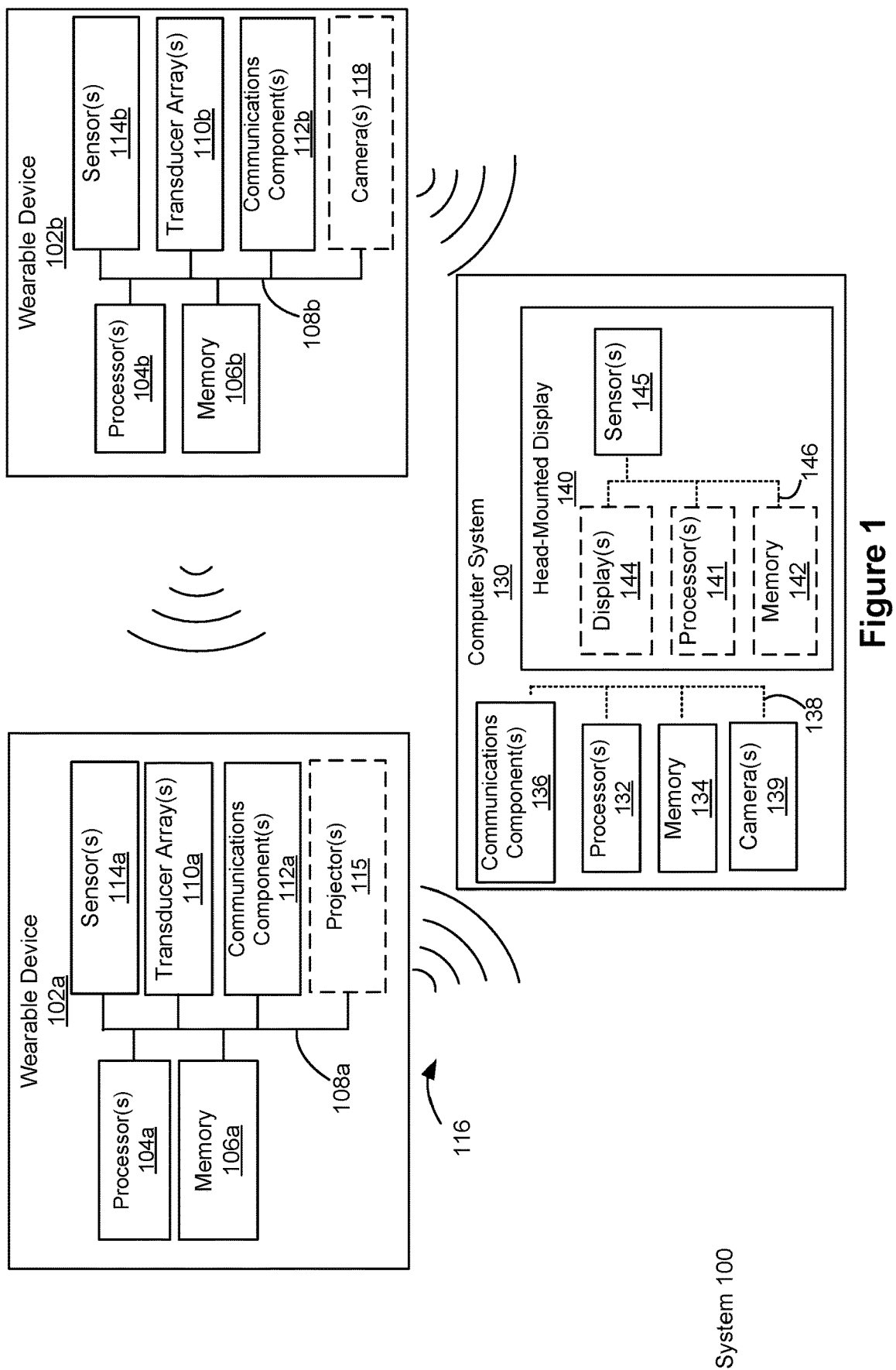
FIG. 1 is a block diagram illustrating an exemplary projection system, in accordance with various embodiments.

FIG. 1 is a block diagram illustrating a system 100, in accordance with various embodiments. While some example features are illustrated, various other features have not been illustrated for the sake of brevity and so as not to obscure pertinent aspects of the example embodiments disclosed herein. To that end, as a non-limiting example, the system 100 includes wearable devices 102a, 102b, which are used in conjunction with a computer system 130 (e.g., a host system, a host computer, or a computing device). In some embodiments, the system 100 provides the functionality of a virtual reality device with image projection, an augmented reality device with image projection, a combination thereof, or provides some other functionality. The system 100 is described in greater detail below with reference FIGS. 11-13.

An example wearable device 102 (e.g., wearable device 102a) includes, for example, one or more processors/cores 104 (referred to henceforth as "processors"), a memory 106, one or more transducer arrays 110, one or more communications components 112, projector(s) 115, and/or one or more sensors 114. In some embodiments, these components are interconnected by way of a communications bus 108. References to these components of the wearable device 102 cover embodiments in which one or more of these components (and combinations thereof) are included. In some embodiments, the one or more sensors 114 are part of the one or more transducer arrays 110 (e.g., transducers in the transducer arrays 110 also perform the functions of the one or more sensors 114, discussed in further detail below). For example, one or more transducers in the transducer array 110 may be electroacoustic transducers configured to detect acoustic waves (e.g., ultrasonic waves).

Another example wearable device 102 (e.g., wearable device 102b) includes, for example, one or more processors/cores 104 (referred to henceforth as "processors"), a memory 106, one or more transducer arrays 110, one or more communications components 112, camera(s) 118, and/or one or more sensors 114. In some embodiments, these components are interconnected by way of a communications bus 108. References to these components of the wearable device 102 cover embodiments in which one or more of these components (and combinations thereof) are included. In some embodiments, the one or more sensors 114 are part of the one or more transducer arrays 110 (e.g., transducers in the transducer arrays 110 also perform the functions of the one or more sensors 114, discussed in further detail below). For example, one or more transducers in the transducer array 110 may be electroacoustic transducers configured to detect acoustic waves (e.g., ultrasonic waves).

In some embodiments, a single processor 104 (e.g., processor 104 of the wearable device 102a) executes software modules for controlling multiple wearable devices 102 (e.g., wearable devices 102b . . . 102n). In some embodiments, a single wearable device 102 (e.g., wearable device 102a) includes multiple processors 104, such as one or more wearable device processors (configured to, e.g., generate an image for projection), one or more communications component processors (configured to, e.g., control communications transmitted by communications component 112 and/or receive communications by way of communications component 112) and/or one or more sensor processors (configured to, e.g., control operation of sensor 114 and/or receive output from sensor 114).

Figure 4:
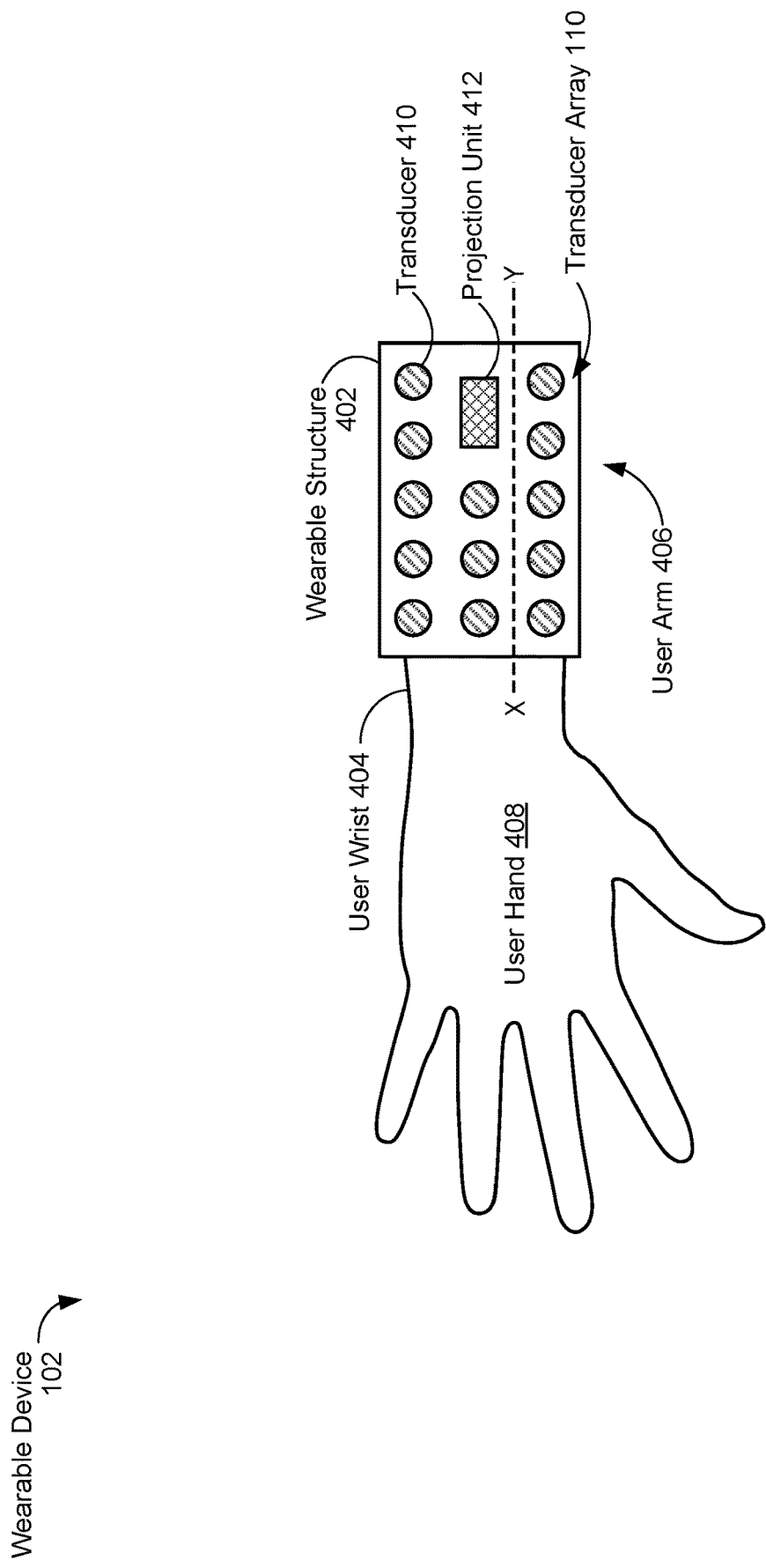
FIG. 4 is an exemplary view of a wearable device on a user's wrist, in accordance with some embodiments.
Figure 8:
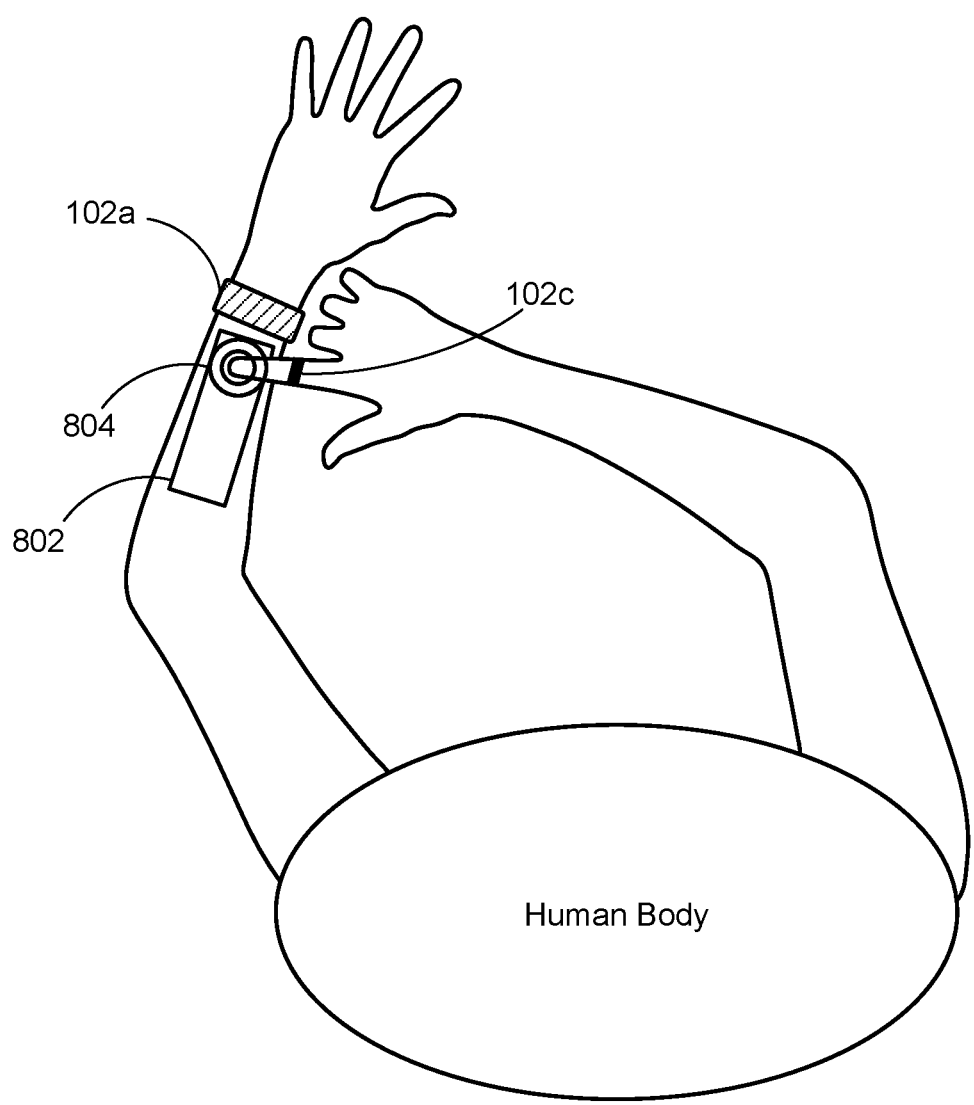
FIG. 8 is an exemplary view of a wearable device on a user's wrist and on the user's finger, in accordance with some embodiments.

In some embodiments, the wearable device 102 is configured to project image(s) 802 (as shown in FIG. 8) via the projector(s) 115 within projection unit 412 (shown in FIG. 4). In such embodiments, the wearable device 102 is configured to generate and project images (e.g., a keyboard or the like) onto the user's own appendage using, e.g., one or more of the one or more projectors 115. The AR system 1100 (FIG. 11) shows an example wearable device that can project images (at least in some embodiments).

In some other embodiments, the wearable device 102 does not project images and instead the computer system 130 (and the head-mounted display 140) is (are) responsible for projecting images onto the user's own appendage. Alternatively, in some embodiments, the computer system 130 (and the head-mounted display 140) uses augmented reality so that the user perceives images on his or her own appendage, but nothing is actually projected. AR system 1200 (FIG. 12) and VR system 1300 (FIG. 13) can be used to project/display images onto the user or areas around the user.

In some embodiments, the transducers in a respective transducer array 110 are miniature piezoelectric actuators/devices, vibrotactile actuators, or the like. In some embodiments, the transducers in a respective transducer array 110 are single or multipole voice coil motors, or the like. Each transducer array 110 is configured to generate and transmit signals 116 in response to being activated by the wearable device (e.g., via processors 104 or some other controller included in the wearable device 102). In some embodiments, the signals 116 are mechanical waves (e.g., sound waves, ultrasonic waves, or various other mechanical waves). A mechanical wave is an oscillation of matter that transfers energy through a medium. As discussed herein, the "medium" is the wearer's skin, flesh, bone, blood vessels, etc. It is noted that any device capable of producing mechanical waves can be used as a transducer in the disclosed wearable device 102. It is also noted that signals (e.g., waves) that propagate through the medium (e.g., the user's flesh) are said herein to "couple" to the medium or "couple into" the medium.

In some embodiments, the wearable device 102 (e.g., wearable device 102a, 102b) is a receiver and transmitter of one or more signals. For example, in addition to transmitting signals (e.g., mechanical waves), as described above, the wearable device 102 is also configured to receive (e.g., detect, sense) signals transmitted by itself or by another wearable device 102. To illustrate, a first wearable device 102a may transmit a plurality of signals through a medium, such as the wearer's body, and a second wearable device 102b (attached to the same wearer) may receive at least some of the signals transmitted by the first wearable device 102a through the medium. Furthermore, a wearable device 102 receiving transmitted signals may use the received signals to determine that a user contacted a particular part of his or her body. To illustrate, the second wearable device 102b may initially receive signals transmitted by the first wearable device 102a through the medium that have a first set of parameters (e.g., values of phase, amplitude, frequency, etc.). The second wearable device 102b may use these initial waves to form a normalized baseline. Thereafter, the wearer of the first and second wearable devices 102 may contact (e.g., touch) a region of her body (e.g., forearm) through which the transmitted signals are travelling. By touching her forearm for example, the wearer alters the signals travelling through her forearm, and in turn the first set of parameters associated with the signals (e.g., values of one or more of phase, amplitude, frequency, etc. may change). Importantly, the second wearable device 102b then receives (e.g., detects, senses) these altered signals and can subsequently determine that the user contacted a particular part of her body, e.g., her forearm. The second wearable device 102b may further determine that the user contacted a specific part of her forearm (e.g., a change in the phase value by a certain amount from the normalized baseline may indicate that a specific part of her forearm was touched).

The computer system 130 is a computing device that executes virtual reality applications and/or augmented reality applications to process input data from the sensors 145 on the head-mounted display 140 and the sensors 114 on the wearable device 102. The computer system 130 provides output data to at least (i) the electronic display 144 on the head-mounted display 140 and (ii) the wearable device 102 (e.g., processors 104 of the haptic device 102, FIG. 2A). An exemplary computer system 130, for example, includes one or more processor(s)/core(s) 132, memory 134, one or more communications components 136, and/or one or more cameras 139. In some embodiments, these components are interconnected by way of a communications bus 138. References to these components of the computer system 130 cover embodiments in which one or more of these components (and combinations thereof) are included.

Figure 12:
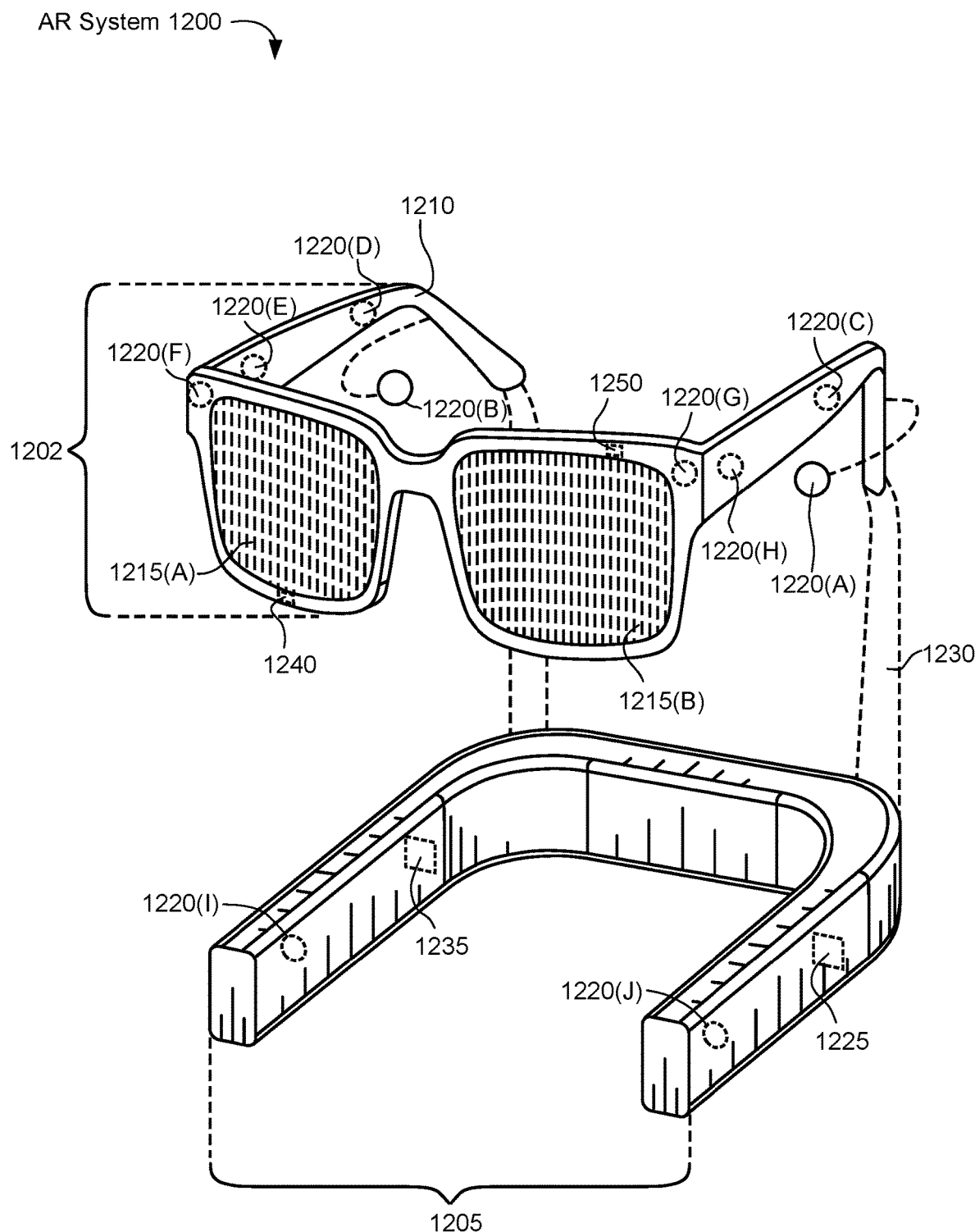
FIG. 12 illustrates an embodiment of an augmented reality headset and a corresponding neckband.

In some embodiments, the computer system 130 is a standalone device that is coupled to a head-mounted display 140. For example, the computer system 130 has processor(s)/core(s) 132 for controlling one or more functions of the computer system 130 and the head-mounted display 140 has processor(s)/core(s) 141 for controlling one or more functions of the head-mounted display 140. Alternatively, in some embodiments, the head-mounted display 140 is a component of computer system 130. For example, the processor(s) 132 controls functions of the computer system 130 and the head-mounted display 140. In addition, in some embodiments, the head-mounted display 140 includes the processor(s) 141 that communicate with the processor(s) 132 of the computer system 130. In some embodiments, communications between the computer system 130 and the head-mounted display 140 occur via a wired (or wireless) connection between communications bus 138 and communications bus 146. In some embodiments, the computer system 130 and the head-mounted display 140 share a single communications bus. It is noted that in some instances the head-mounted display 140 is separate from the computer system 130 (as shown in FIG. 12).

The computer system 130 may be any suitable computer device, such as a laptop computer, a tablet device, a netbook, a personal digital assistant, a mobile phone, a smart phone, a virtual reality device (e.g., a virtual reality (VR) device, an augmented reality (AR) device, or the like), a gaming device, a computer server, or any other computing device. The computer system 130 is sometimes called a host or a host system. In some embodiments, the computer system 130 includes other user interface components such as a keyboard, a touch-screen display, a mouse, a track-pad, and/or any number of supplemental I/O devices to add functionality to computer system 130.

In some embodiments, one or more cameras 139 of the computer system 130 are used to facilitate virtual reality and/or augmented reality. Moreover, in some embodiments, the one or more cameras 139 also act as projectors to display the virtual and/or augmented images (or in some embodiments the computer system includes one or more distinct projectors). In some embodiments, the computer system 130 provides images captured by the one or more cameras 139 to the display 144 of the head-mounted display 140, and the display 144 in turn displays the provided images. In some embodiments, the processors 141 of the head-mounted display 140 process the provided images. It is noted that in some embodiments, one or more of the cameras 139 are part of the head-mounted display 140.

Figure 13:
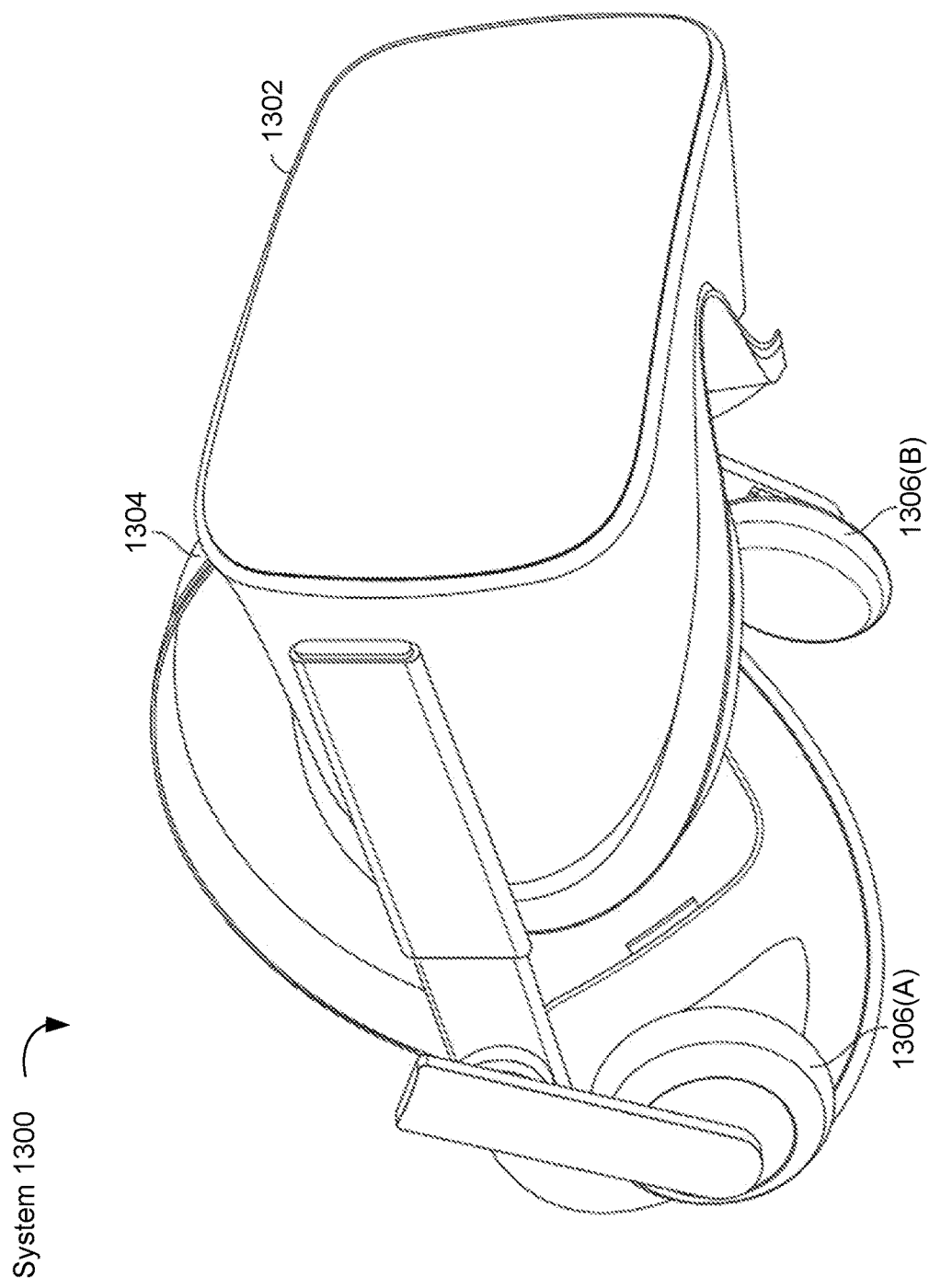
FIG. 13 illustrates an embodiment of a virtual reality headset.

The head-mounted display 140 presents media to a user. Examples of media presented by the head-mounted display 140 include images, video, audio, or some combination thereof. In some embodiments, audio is presented via an external device (e.g., speakers and/or headphones) that receives audio information from the head-mounted display 140, the computer system 130, or both, and presents audio data based on the audio information. The displayed images may be in virtual reality, augmented reality, or mixed reality. An exemplary head-mounted display 140, for example, includes one or more processor(s)/core(s) 141, a memory 142, and/or one or more displays 144. In some embodiments, these components are interconnected by way of a communications bus 146. References to these components of the head-mounted display 140 cover embodiments in which one or more of these components (and combinations thereof) are included. It is noted that in some embodiments, the head-mounted display 140 includes one or more sensors 145. Alternatively, in some embodiments, the one or more sensors 145 are part of the computer system 130. FIGS. 12 and 13 illustrate additional examples (e.g., AR system 1200 and VR system 1300) of the head-mounted display 140.

The electronic display 144 displays images to the user in accordance with data received from the computer system 130. In various embodiments, the electronic display 144 may comprise a single electronic display or multiple electronic displays (e.g., one display for each eye of a user).

The sensors 145 include one or more hardware devices that detect spatial and motion information about the head-mounted display 140. Spatial and motion information can include information about the position, orientation, velocity, rotation, and acceleration of the head-mounted display 140. For example, the sensors 145 may include one or more inertial measurement units (IMUs) that detect rotation of the user's head while the user is wearing the head-mounted display 140. This rotation information can then be used (e.g., by the computer system 130) to adjust the images displayed on the electronic display 144. In some embodiments, each IMU includes one or more gyroscopes, accelerometers, and/or magnetometers to collect the spatial and motion information. In some embodiments, the sensors 145 include one or more cameras positioned on the head-mounted display 140.

In some embodiments, the transducer array 110 of the wearable device 102 may include one or more transducers configured to generate and/or receive signals. Integrated circuits (not shown) of the wearable device 102, such as a controller circuit and/or signal generator (e.g., waveform generator), may control the behavior of the transducers (e.g., controller 412, FIG. 4).

The communications component 112 of the wearable device 102 may include a communications component antenna for communicating with the computer system 130. Moreover, the communications component 136 may include a complementary communications component antenna that communicates with the communications component 112. The respective communication components are discussed in further detail below with reference to FIGS. 2 and 3.

In some embodiments, data contained within communication signals is used by the wearable device 102 for selecting and/or generating projection images. In some embodiments, the data contained within the communication signals alerts the computer system 130 that the wearable device 102 is ready for use. As will be described in more detail below, the computer system 130 sends instructions to the wearable device 102, and in response to receiving the instructions, the wearable device generates projection images 802 that are displayed on an appendage of the user of the wearable device 102. Alternatively or in addition, in some embodiments, the wearable device 102 sends signals to the computer device 130 that include information indicating a location of a touch on the user's body (or a position of an appendage with respect to a position of the wearable device). As explained above, a wearable device receiving signals transmitted by another wearable device is able to determine, based on changes of signal parameters caused by the touch, a location of the touch on the wearer's body. As one example, a keyboard (or some other user interface) may be projected or perceived to be projected onto the user's forearm, and the wearable device may determine, based on changes of signal parameters caused by the touch, that the user is intending to interact with a first affordance of the keyboard. In this way, the system 100 provides a novel way of determining where (and/or whether) a person contacts his or her skin (e.g., in combination with or separate from other video-based means for making this determination). This is particularly useful when augmented reality is being used, and actual images are not in fact projected onto the user's body. In another example, the wearable device may determine, based on changes of signal parameters, that the user touched her forearm. Information related to the touch may then be sent to the computer device 130 and used by the computer device 130 to confirm that a touch occurred on the forearm.

Non-limiting examples of sensors 114 and/or sensors 145 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, sensors 114 and/or sensors 145 are configured to gather data that is used to determine a hand posture of a user of the wearable device and/or an impedance of the medium. Examples of sensor data output by these sensors include: body temperature data, infrared range-finder data, motion data, activity recognition data, silhouette detection and recognition data, gesture data, heart rate data, and other wearable device data (e.g., biometric readings and output, accelerometer data). In some embodiments, the transducers themselves serve as sensors.

Figure 2:
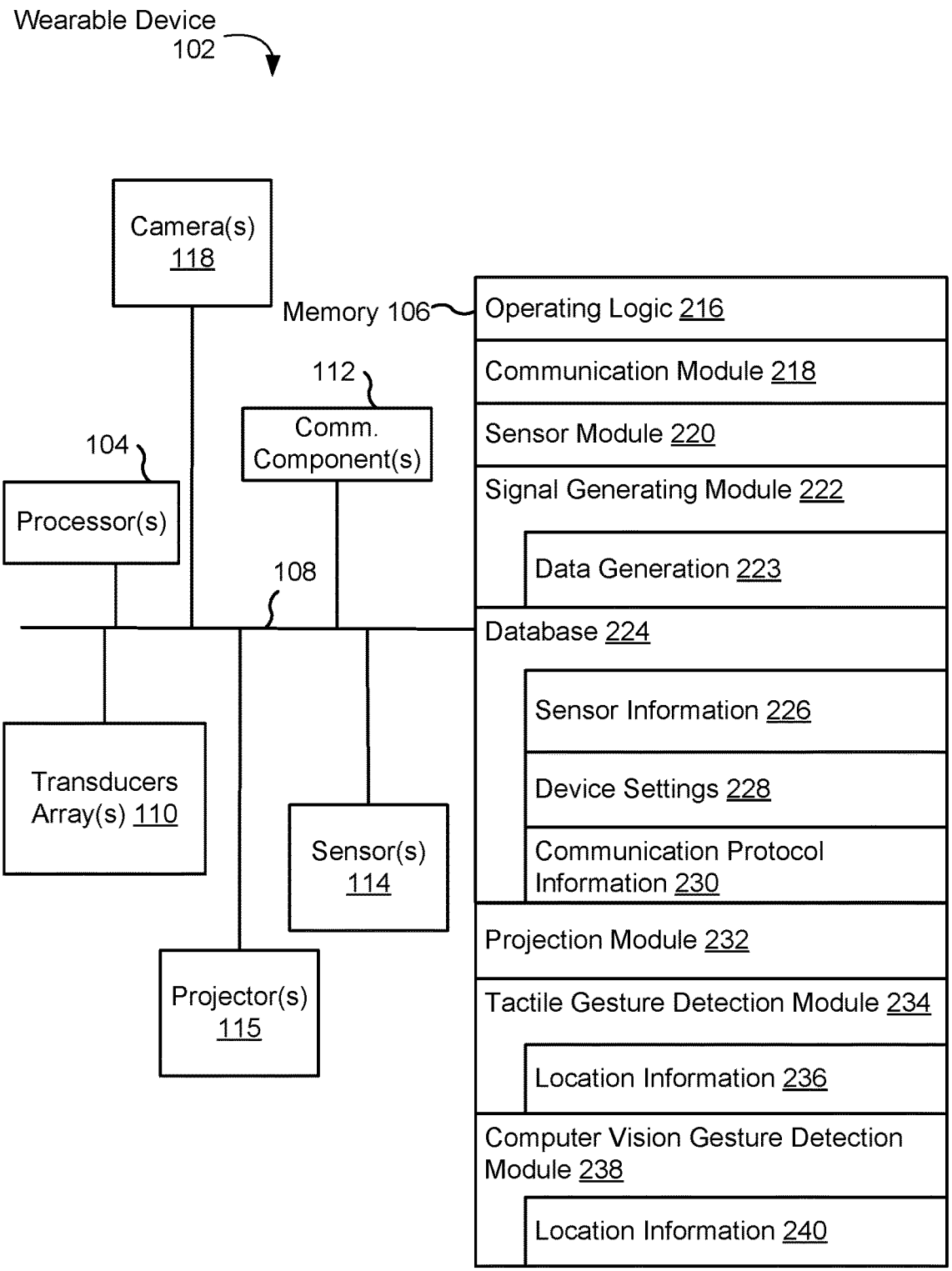
FIG. 2 is a block diagram illustrating an exemplary wearable device in accordance with some embodiments.

FIG. 2 is a block diagram illustrating a representative wearable device 102 in accordance with some embodiments. In some embodiments, the wearable device 102 includes one or more processing units (e.g., CPUs, microprocessors, and the like) 104, one or more communication components 112, memory 106, one or more transducer arrays 110, one or more projectors 115, one or more cameras 118, and one or more communication buses 108 for interconnecting these components (sometimes called a chipset). In some embodiments, the wearable device 102 includes one or more sensors 114 as described above with reference to FIG. 1. In some embodiments (not shown), the wearable device 102 includes one or more output devices such as one or more indicator lights, sound cards, speakers, displays for displaying textual information and error codes, etc.

Transducers of a respective transducer array 110 generate signals 116 (FIG. 1). In some embodiments, the transducers include, e.g., hardware capable of generating the signals 116 (e.g., electromagnetic waves, soundwaves, ultrasound waves, etc.). For example, each transducer can convert electrical signals into ultrasound waves. The transducers may be miniature piezoelectric transducers, capacitive transducers, single or multipole voice coil motors, and/or any other suitable device for creation of signals. Additionally, in some embodiments, the transducers can also receive signals (e.g., if the transducer can generate sound waves, it can also receive sound waves). Continuing, in some embodiments, the transducers may also be any of the sensors 114 described above with reference to FIG. 1. In some embodiments, a first wearable device 102a includes first transducers (e.g., transducers for receiving, sensing, detecting, etc.) while a second wearable 102b includes second transducers (e.g., transducers for generates signals to be sensed by the first transducers) distinct from the first transducers.

The communication component(s) 112 enable communication between the wearable device 102 and one or more communication networks. In some embodiments, the communication component(s) 112 include, e.g., hardware capable of data communications using any of a variety of wireless protocols (e.g., IEEE 802.15.4, Wi-Fi, ZigBee, 6LoWPAN, Thread, Z-Wave, Bluetooth Smart, ISA100.11a, WirelessHART, MiWi, etc.), wired protocols (e.g., Ethernet, HomePlug, etc.), and/or any other suitable communication protocol, including communication protocols not yet developed as of the filing date of this document.

The memory 106 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 106, or alternatively the non-volatile memory within memory 106, includes a non-transitory computer-readable storage medium. In some embodiments, the memory 106, or the non-transitory computer-readable storage medium of the memory 106, stores the following programs, modules, and data structures, or a subset or superset thereof:

- operating logic 216 including procedures for handling various basic system services and for performing hardware dependent tasks;
- communication module 218 for coupling to and/or communicating with remote devices (e.g., computer system 130, other wearable devices, etc.) in conjunction with communication component(s) 112;
- sensor module 220 for obtaining and processing sensor data (e.g., in conjunction with sensor(s) 114 and/or transducer arrays 110) to, for example, determine an orientation of the wearable device 102 and sensing signals generated by one or more transducers (among other purposes such as determining skin contact of the user of the wearable device);
- signal generating module 222 for generating and transmitting (e.g., in conjunction with transducers(s) 110) signals. In some embodiments, the module 222 also includes or is associated with a data generation module 223 that is used to generate data corresponding to the received portion of the transmitted signals;
- database 224, including but not limited to:
  - sensor information 226 for storing and managing data received, detected, and/or transmitted by one or more sensors (e.g., sensors 114, one or more remote sensors, and/or transducer arrays 110);
  - device settings 228 for storing operational settings for the wearable device 102 and/or one or more remote devices (e.g., selected characteristics/parameters values for the signals); and
  - communication protocol information 230 for storing and managing protocol information for one or more protocols (e.g., custom or standard wireless protocols, such as ZigBee, Z-Wave, etc., and/or custom or standard wired protocols, such as Ethernet);
- projection module 232 for projecting one or more images onto an appendage of the wearer or user of the wearable device;
- tactile gesture detection module 234 for detecting a touch gesture on the one or more projected images projected via projector 115, including but not limited to:
  - tactile location information 236 for detecting a location of the touch gesture on the one or more projected images; and
- computer vision gesture detection module 238 for detecting a touch gesture on the one or more projected images detected via camera 118, including but not limited to:
  - computer vision location information 240 for detecting a location of the touch gesture on the one or more projected images using computer vision analysis.

In some embodiments, the tactile gesture detection module 234 uses a known impedance map of the user's body, capacitive coupling technologies, signal processing techniques, and/or acoustic wave coupling (e.g., ultrasound waves) when determining a location of the touch gesture. In some embodiments, the tactile gesture detection module 234 communicates with the sensor module 220 to determine a location of the touch gesture on the user's body (e.g., based on the sensor data obtained by the sensor module 220, the tactile gesture detection module 234 can determine a location of the touch gesture). In some embodiments, the tactile gesture detection module 234 and/or the computer vision gesture detection module 238 is (are) located at the computer system 130.

In some embodiments, the location information 236, 240 is determined using computer vision technologies and/or non-optical imaging techniques using capacitance, magnetism, and millimeter wave technologies.

In some embodiments (not shown), the wearable device 102 includes a location detection device, such as a GNSS (e.g., GPS, GLONASS, etc.) or other geo-location receiver, for determining the location of the wearable device 102. Further, in some embodiments, the wearable device 102 includes location detection module (e.g., a GPS, Wi-Fi, magnetic, or hybrid positioning module) for determining the location of the wearable device 102 (e.g., using the location detection device) and providing this location information to the host system 130.

In some embodiments (not shown), the wearable device 102 includes a unique identifier stored in database 224. In some embodiments, the wearable device 102 sends the unique identifier to the host system 130 to identify itself to the host system 130. This is particularly useful when multiple wearable devices are being concurrently used.

Each of the above-identified elements (e.g., modules stored in memory 106 of the wearable device 102) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 106, optionally, stores a subset of the modules and data structures identified above. Furthermore, the memory 106, optionally, stores additional modules and data structures not described above.

Figure 3:
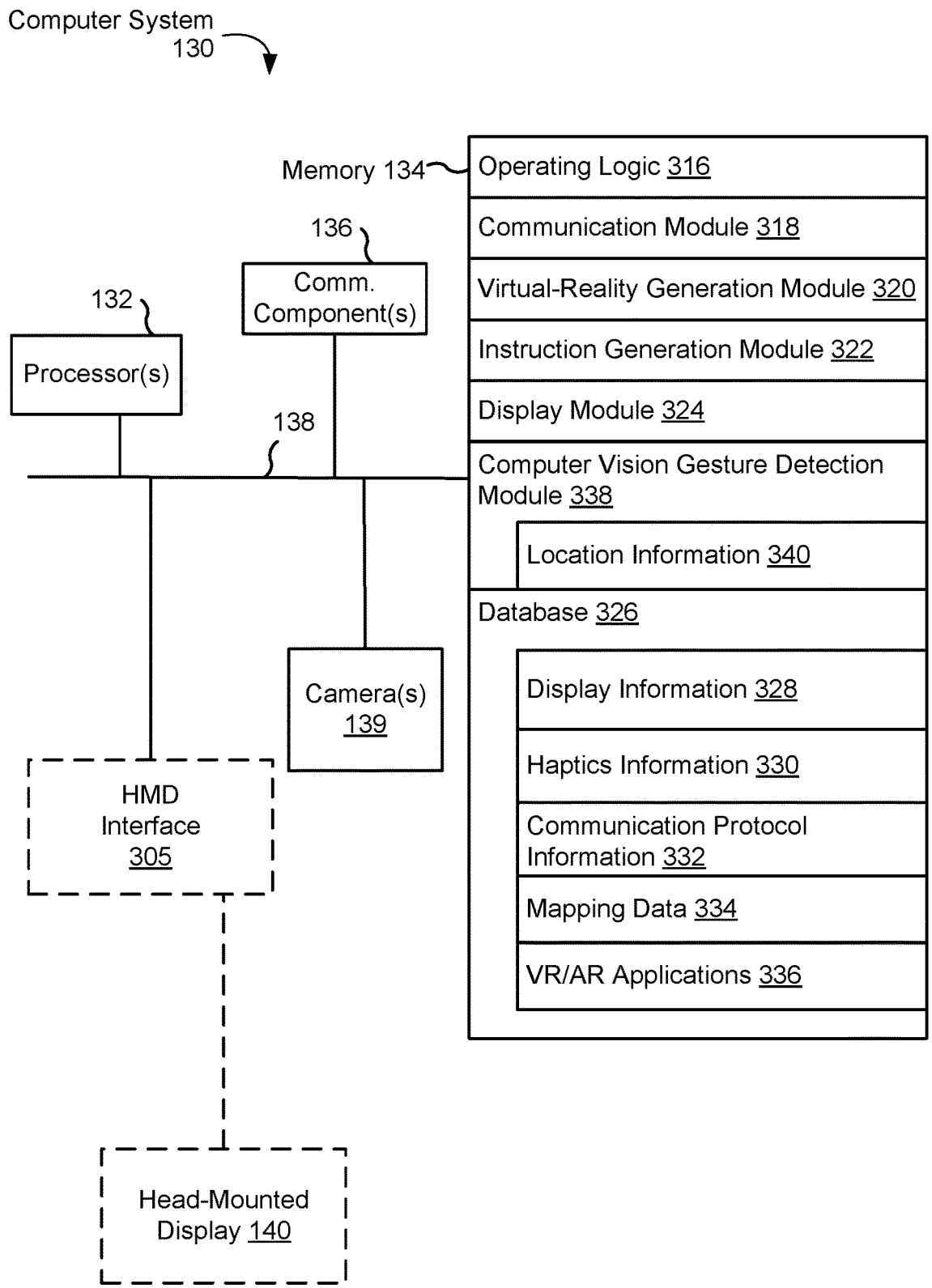
FIG. 3 is a block diagram illustrating an exemplary computer system in accordance with some embodiments.

FIG. 3 is a block diagram illustrating a representative computer system 130 in accordance with some embodiments. In some embodiments, the computer system 130 includes one or more processing units/cores (e.g., CPUs, GPUs, microprocessors, and the like) 132, one or more communication components 136, memory 134, one or more cameras 139, and one or more communication buses 138 for interconnecting these components (sometimes called a chipset). In some embodiments, the computer system 130 includes a head-mounted display interface 305 for connecting the computer system 130 with the head-mounted display 140. As discussed above in FIG. 1, in some embodiments, the computer system 130 and the head-mounted display 140 are together in a single device, whereas in other embodiments the computer system 130 and the head-mounted display 140 are separate from one another.

Although not shown, in some embodiments, the computer system (and/or the head-mounted display 140) includes one or more sensors 145 (as discussed above with reference to FIG. 1) and/or one or more instances of the transducer arrays.

The communication component(s) 136 enable communication between the computer system 130 and one or more communication networks. In some embodiments, the communication component(s) 136 include, e.g., hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.), custom or standard wired protocols (e.g., Ethernet, HomePlug, etc.), and/or any other suitable communication protocol, including communication protocols not yet developed as of the filing date of this document.

The memory 134 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 134, or alternatively the non-volatile memory within memory 134, includes a non-transitory computer-readable storage medium. In some embodiments, the memory 134, or the non-transitory computer-readable storage medium of the memory 134, stores the following programs, modules, and data structures, or a subset or superset thereof:

- operating logic 316 including procedures for handling various basic system services and for performing hardware dependent tasks;
- communication module 318 for coupling to and/or communicating with remote devices (e.g., wearable devices 102a-102-n, a remote server (not shown), etc.) in conjunction with communication component(s) 136;
- virtual-reality generation module 320 that is used for generating virtual-reality images and sending corresponding video and audio data to the HMD 140 (in some embodiments, the virtual-reality generation module 320 is an augmented-reality generation module 320 (or the memory 134 includes a distinct augmented-reality generation module) that is used for generating augmented-reality images and projecting those images in conjunction with the camera(s) 139 and the HMD 140);
- instruction module 322 that is used for generating an instruction that, when sent to the wearable device 102 (e.g., using the communications component 136), causes the wearable device 102 to activate one or more transducers;
- display module 324 that is used for displaying virtual-reality images and/or augmented-reality images in conjunction with the head-mounted display 140 and/or the camera(s) 139;
- computer vision gesture detection module 338 for detecting a touch gesture detected via camera 139, including but not limited to:
  - computer vision location information 340 for detecting a location of the touch gesture using computer vision analysis.
- database 326, including but not limited to:
  - display information 328 for storing (and generating) virtual-reality images and/or augmented-reality images (e.g., visual data);
  - haptics information 330 for storing/generating haptics information that corresponds to displayed virtual-reality images and environments and/or augmented-reality images and environments;
  - communication protocol information 332 for storing and managing protocol information for one or more protocols (e.g., custom or standard wireless protocols, such as ZigBee, Z-Wave, etc., and/or custom or standard wired protocols, such as Ethernet); and
  - mapping data 334 for storing and managing mapping data (e.g., mapping one or more wearable devices 102 on a user).

In the example shown in FIG. 3, the computer system 130 further includes virtual-reality (and/or augmented-reality) applications 336. In some embodiments, the virtual-reality applications 336 are implemented as software modules that are stored on the storage device and executed by the processor. Each virtual-reality application 336 is a group of instructions that, when executed by a processor, generates virtual or augmented reality content for presentation to the user. A virtual-reality application 336 may generate virtual/augmented-reality content in response to inputs received from the user via movement of the head-mounted display 140 or the wearable device 102. Examples of virtual-reality applications 336 include gaming applications, conferencing applications, and video playback applications.

The virtual-reality generation module 320 is a software module that allows virtual-reality applications 336 to operate in conjunction with the head-mounted display 140 and the wearable device 102. The virtual-reality generation module 320 may receive information from the sensors 145 on the head-mounted display 140 and may, in turn provide the information to a virtual-reality application 336. Based on the received information, the virtual-reality generation module 320 determines media content to provide to the head-mounted display 140 for presentation to the user via the electronic display 144. For example, if the virtual-reality generation module 320 receives information from the sensors 145 on the head-mounted display 140 indicating that the user has looked to the left, the virtual-reality generation module 320 generates content for the head-mounted display 140 that mirrors the user's movement in a virtual/augmented environment. An example VR system 1300 is provided in FIG. 13.

Similarly, in some embodiments, the virtual-reality generation module 320 receives information from the sensors 114 on the wearable device 102 and provides the information to a virtual-reality application 336. The application 336 can use the information to perform an action within the virtual/augmented world of the application 336. For example, if the virtual-reality generation module 320 receives information from the sensors 114 that the user has raised his hand, a simulated hand (e.g., the user's avatar) in the virtual-reality application 336 lifts to a corresponding height. As noted above, the information received by the virtual-reality generation module 320 can also include information from the head-mounted display 140. For example, cameras 139 on the head-mounted display 140 may capture movements of the user (e.g., movement of the user's arm), and the application 336 can use this additional information to perform the action within the virtual/augmented world of the application 336.

To further illustrate with an augmented reality example, if the augment-reality generation module 320 receives information from the sensors 114 that the user has rotated his forearm while in augmented reality, a user interface (e.g., a keypad) is displayed on the user's forearm, the augmented-reality generation module 320 generates content for the head-mounted display 140 that mirrors the user's movement in the augmented environment (e.g., the user interface rotates in accordance with the rotation of the user's forearm). An example AR system 1200 is provided in FIG. 12.

In some embodiments, the computer system 130 receives sensor data from the wearable device 102 and the computer system 130 includes a module to determine a touch location associated with the sensor data. In some embodiments, the computer system 130 determines a touch location (e.g., using the computer vision gesture detection module 338) based on sensor data from the wearable device 102 and image data captured by the one or more camera 139. In this way, a majority of the processing is offloaded from the wearable device 102 to the computer system 130, which may have increased processing abilities.

Each of the above identified elements (e.g., modules stored in memory 134 of the computer system 130) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 134, optionally, stores a subset of the modules and data structures identified above.

FIG. 4 is an example view 400 of the wearable device 102 (e.g., wearable device 102a, 102b, FIG. 1) in accordance with some embodiments. The view 400 shows the user's hand 408, user's wrist 404, user's arm 406, and the wearable device 102 on the user's arm 406. Such an arrangement is merely one possible arrangement, and one skilled in the art will appreciate that the discussion herein is not limited to the arrangement shown in FIG. 4. Additionally, the wearable device 102 shown in FIG. 4 is shown oversized for ease of illustration. In practice, a size of the wearable device 102 can be reduced, if desired, so that the wearable device 102 has a size similar to a smart watch or fitness tracker.

Figure 5:
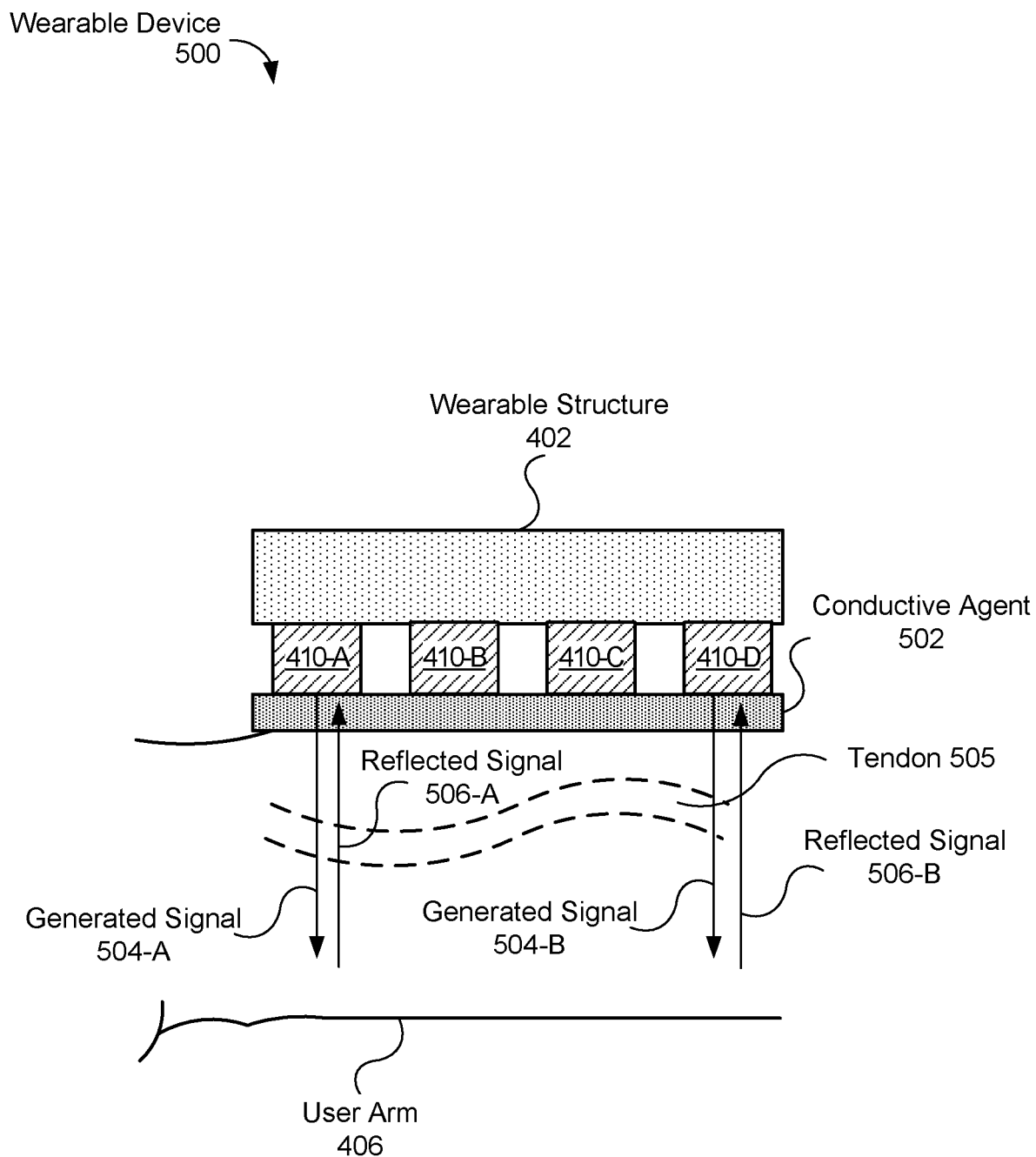
FIG. 5 is an exemplary cross-sectional view of a wearable device on a user's wrist, in accordance with some embodiments.

The wearable device 102 includes a wearable structure 402 that may be a flexible mechanical substrate such as a plastic (e.g., polyethylene or polypropylene), rubber, nylon, synthetic, polymer, etc. In some embodiments, the wearable structure 402 is configured to be worn around at least a portion of a user's wrist or arm 404/406 (and various other body parts). The wearable device 102 includes a transducer array 110, including a plurality of transducers 410 arranged at different locations on the wearable structure 402. The transducers 410 can be arranged in a pattern along an inner surface of the wearable structure 402 facing the arm 406 such that the transducers 410 contact the user's skin. In another example, the transducers can be arranged in a radial pattern along an inner perimeter of the wearable structure 602 (FIG. 5).

In some embodiments, a respective transducer 410 is configured to generate signals (e.g., waves 116, FIG. 1) in response to receiving one or more control signals from a controller (not shown). The one or more control signals instruct one or more transducers 410 in the transducer array 110 to send signals (e.g., ultrasonic waves) into/through the user's body (e.g., wrist or arm). The signals transmitted by the one or more transducers 410 are to travel (e.g., propagate) away from the wearable structure 402 through the user's body. For example, the signals may travel from the user's arm 406, through the user's wrist 404, to the user's hand 408 and fingers. In addition, the signals may travel up the user's arm and eventually travel throughout the user's body.

In some embodiments, the wearable structure 402 includes a projection unit 412 (e.g., projector 115, FIG. 1A) that projects images onto an appendage of a user. In some embodiments, the wearable structure 402 includes a memory (e.g., memory 106, FIG. 1) that stores images to be displayed. For example, the stored images may represent a user interface having keyboard with multiple affordances (various other "touch" interfaces could also be projected onto the user's appendage). In some embodiments, the controller 412 generates a control signal (or multiple signals) based on an instruction from a host system (e.g., computer system 130, FIG. 1). In such embodiments, the wearable device 102 is placed on a user's arm 406 (or various other locations) to project images onto the forearm 406 of the user. Alternatively, in some embodiments, the wearable device 102 does not project images but instead, through the computer system 130 and the head-mounted display 140, images are perceived on the user's arm (or other body part) through augmented reality. In such embodiments, the wearable device 102 is configured to sense interaction with the user's body. Put another way, the wearable device 102 is used to track a virtual image virtualized by another device (e.g., head-mounted display 140), as if the image were projected onto the user's arm. For example, a camera and/or projector of the other device (e.g., headset, glasses, head-mounted display 140) may project an image onto its own lens (e.g., display 144, FIG. 1). Augmented reality technologies (e.g., AR system 1200, FIG. 12) may implement such an embodiment.

In some embodiments, the other device tracks the user's arm 406 and adjusts the image (e.g., in augmented reality) in accordance with movements of the user's arm 406. For example, cameras 139 may be used to track the user's arm 406.

In some embodiments, the transducer array 110 includes transducers 410 designed to make contact with human skin. A contact area having a conductive agent and padding may be used on the wearable device 102 behind each transducer to improve subject comfort and reduce contact impedances (e.g., as shown in FIG. 5). The conductive agent between the transducer and skin may be a "wet" connection using a conductive gel, which may consist of propylene glycol and NaCl, or a "dry" connection, such as a thin layer of conductive polymer (e.g., carbon-doped PDMS).

FIG. 5 is an example cross sectional view 500 of the wearable device 400 taken along the X-Y line shown in FIG. 4, in accordance with some embodiments. The cross sectional view 500 shows the user's arm 406 and a tendon 505 within the user's arm 406. In this particular example, the transducers 410 do not fully wrap around the wrist (e.g., transducers 410-A-410-D are disposed on one side of the user's arm 406).

One or more of the transducers 410-A-410-D can generate signals (e.g., waves 504-A and 504-B) in the user's arm 406. The generated signals 504-A and 504-B may extend into the user's body (e.g., extend into the epidermis, the dermis, the muscles, the tendons, the ligaments, the bones, etc.). In some embodiments, each transducer 410 varies one or more of a time period of the signal, an amplitude of the signal, and a phase of the signal when generating the signals.

To provide some content, the generated signals 504-A, 504-B, or a portion of the signals 504-A, 504-B, are reflected by the tendon 505 and/or a portion of the wearable structure 402. As a result, the reflected signals 506-A, 506-B are received by the transducers 410-A and 410-D. While not shown in FIG. 5, one or more signals transmitted by the wearable device 500 may travel through the user's appendage and may be received (e.g., sensed) by a different wearable device attached to the user.

In some embodiments, the transducers 410 transmit signals into the user's body in a staggered manner, where different subsets of the transducers transmit signals at different times. In some embodiments, the remaining transducers may be used to measure the altered signals that they receive. This procedure may then be repeated for multiple stimulation patterns defining an order of transducers (e.g., pairs of transducers) selected to emit the signals.

Figure 6:
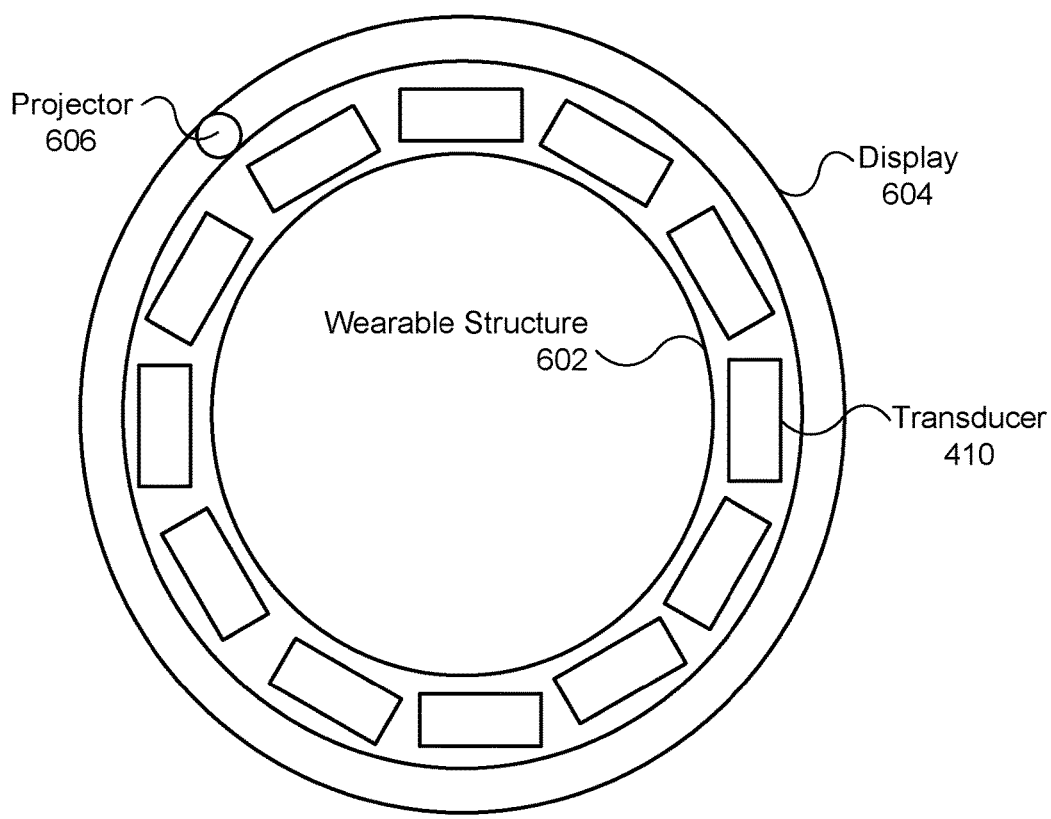
FIG. 6 is an exemplary cross-sectional view of a wearable device in accordance with some embodiments.

FIG. 6 is an exemplary cross-sectional view of a wearable device in accordance with some embodiments. The wearable device 600 is an example of the wearable device 102. The wearable device 600 is configured to be attached to a part of a user's body. For example, the wearable device 600 is configured to be attached to a wrist, forearm, ankle, bicep, calf, thigh, scalp, and/or various other parts of the user's body. In some embodiments, the wearable device 600 is a rigid or semi-rigid structure. Alternatively, in some embodiments, the wearable device 102 is a flexible structure. Although the wearable device 600 is shown as a continuous circle, the wearable device 600 may break apart to be attached to the user's body (e.g., in a similar fashion to a watch).

The wearable device 600 (e.g., wearable device 102, FIGS. 1A, 1B) includes a wearable structure 602. The wearable structure 602 wraps around the part of the user's body. The wearable device 600 further includes a transducer array 110 having a plurality of transducers 410 positioned along an inner perimeter of the wearable structure 602. The transducers 410 in this example are radially spaced, such that the transducers 410 wrap around the wearable structure 602 and form a substantially contiguous circle of transducers. In such an arrangement, the wearable device 600 is able to produce signals 116 in a 360-degree fashion. In some embodiments, the wearable structure 602 separates the transducers 410 from the user's skin. Alternatively, in some embodiments (not shown), the transducers 410 are in direct contact with the user's skin (a conductive agent may also be included). In some embodiments, the wearable structure 602 includes a projector 606 (or multiple projectors) (e.g., projector 115, FIGS. 1A-1B).

Figure 7:
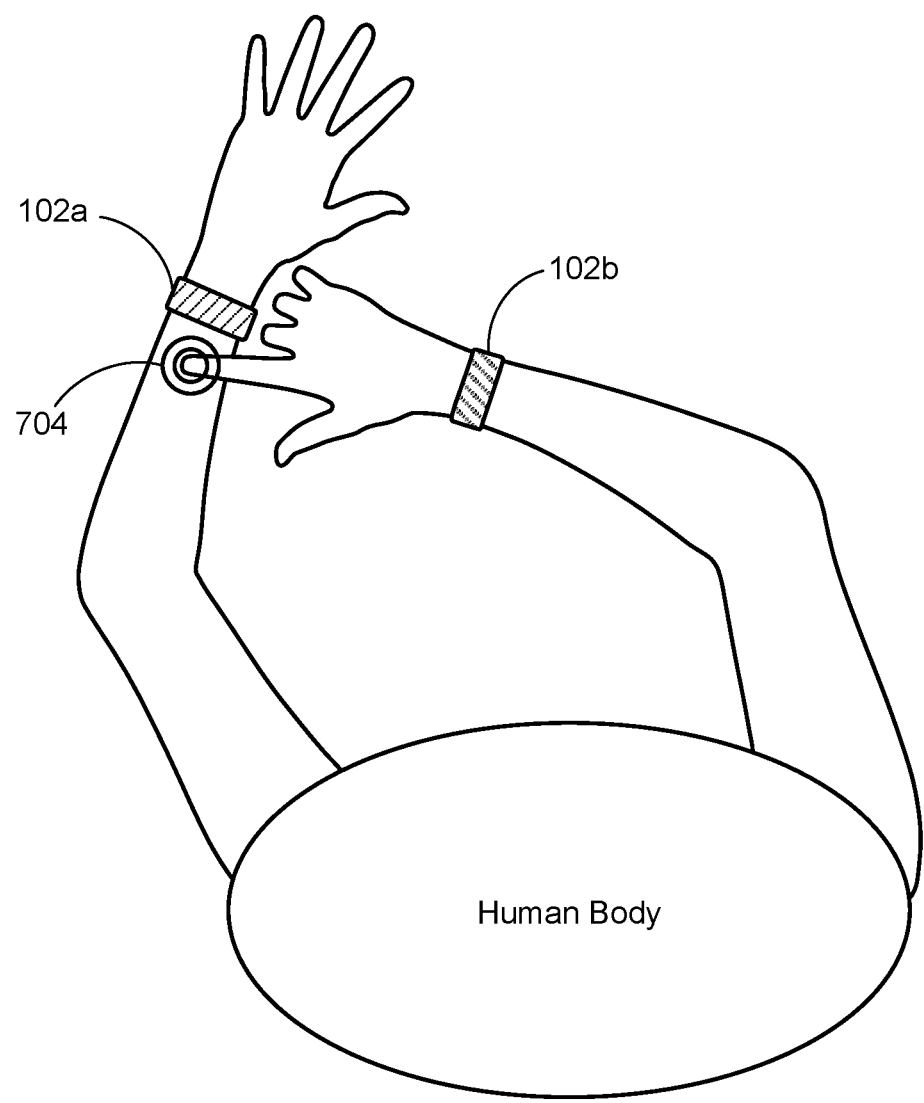
FIG. 7 is an exemplary view of a wearable device on a user's wrist and on the user's second wrist, in accordance with some embodiments.

FIG. 7 is an exemplary view of wearable devices on a user's first wrist and second wrist, in accordance with some embodiments. The arrangement of wearable devices 102 shown in FIG. 7 is used to detect a touch location 704 on the user's body. In some embodiments, a camera is used to detect the touch location 704. Alternatively or in addition, in some embodiments, detected changes in signal parameters are used to detect the touch location 704 or, more broadly, that a touch occurred.

As shown, a first wearable device 102a is worn on the left wrist of the user's left arm and a second wearable device 102b is worn on the right wrist of the user's right arm. In some embodiments, the first and second wearable devices 102 are identical. For example, the first and second wearable devices 102 include the same arrangement and types of transducers 410. Alternatively, in some embodiments, the first and second wearable devices 102 differ in some way. For example, transducers of the first wearable device 102a may differ from the transducers of the second wearable device 102b. The first wearable device 102a may also include one or more sensors 114 that are not included in the second wearable device 102b. Whether or not the first and second wearable device are identical, in some embodiments, the first wearable device 102a may be configured as a receiver and the second wearable device 102b may be configured as a transmitter (or vice versa).

It is noted that FIG. 7 may represent the user touching his left forearm or FIG. 7 may represent the user hovering his finger above his left forearm. It is also noted that signals generated by the second wearable device 102b, at least in some instances, travel up the user's right arm, across the user's body, and down the user's left arm to be received by the first wearable device 102a. Thus, even if the user is not touching his left forearm, the first wearable device 102a is still able to detect signals generated by the second wearable device 102b. Importantly, by contacting his left forearm (or merely bringing his finger close to the left forearm), the user interferes with the signals traveling across his or her body (e.g., the signals that travel up the right arm and eventually down the left arm). In some instances, the first wearable device 102a is able to detect this interference. Moreover, a magnitude of the detected interference may correspond to a particular event. For example, a large magnitude difference (i.e., a large interference) indicates that a touch occurred on the left forearm while a smaller magnitude difference (relative to the large magnitude different) (i.e., a small interference) may indicate that a hover event occurred. It is noted that hover events can be detected in a variety other ways as well. For example, in addition to the signals that travel up the user's right arm, across the user's body, and down the user's left arm to be received by the first wearable device 102a, other signals generated by the second wearable device 102b can become capacitively coupled through the air when hand hovering occurs (e.g., right hand hovers above left arm). The capacitive coupling is detectable and can be classified as a "hover." The capacitive coupling reading can have significant noise, which can contribute to the hover classification (e.g., noise is a factor considered when classifying an event as a hover event). Once the touch is made, the strength of the signal increases (e.g., significant jump detected) and can be classified as a "touch." Additionally, the amount of noise decreases.

FIG. 8 is an exemplary view of wearable devices on a user's wrist and on the user's finger, in accordance with some embodiments. In some embodiments, a first wearable device 102a is worn on the wrist of the user's arm and a second wearable device 102c is worn on a finger on the other arm of the user. In some embodiments, the first wearable device 102a uses one or more projectors 115 to project an image 802 onto the user's arm. Furthermore, the first wearable device 102a may use the one or more projectors 115 or one or more cameras 118 to detect touch gesture with respect to the projected image 802. The touch gesture 804 may be one or more of a tap gesture, a swipe gesture, a pinch gesture, a pull gesture, a twist gesture, etc. on the user's body. In some embodiments, the image 802 is not projected onto the use's arm by a wearable device 102. Instead, the image 802 is perceived in augmented reality. For example, the head-mounted display 140 may display the image 802 onto one or more of the displays 144. Furthermore, the computer system 130 is configured to adjust the display of the image 802 based on detected movement of the user's arm (discussed above with reference to FIG. 3).

Figure 9:
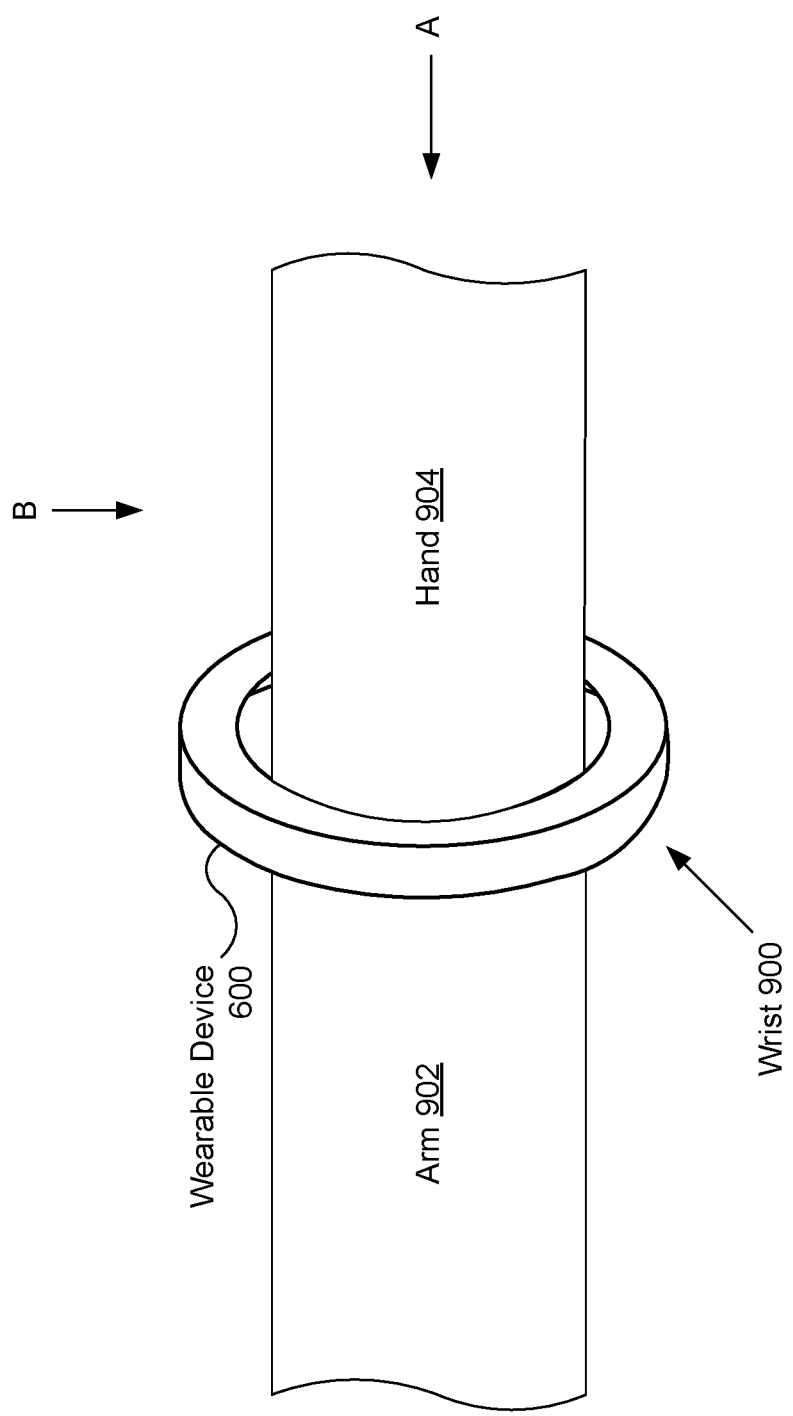
FIG. 9 is an exemplary view of a wearable device on a user's wrist in accordance with some embodiments.

FIG. 9 illustrates the wearable device 600 attached to a user's wrist 900 (e.g., user wrist 404, FIG. 4). Left of the wearable device 600 is the user's arm 902 (e.g., user arm 406, FIG. 4) and right of the wearable device 600 is the user's hand 904 (e.g., user hand 408, FIG. 4). The wearable device 600 could also be attached to a user's ankle and/or various other body parts.

FIGS. 10A-10B are flow diagrams illustrating a method 1000 of determining contact on a user's body in accordance with some embodiments. The steps of the method 1000 are performed by a wearable device (e.g., a wearable device 102, FIG. 1) or multiple instances of the wearable device 102. FIGS. 10A-10B correspond to instructions stored in a computer memory or computer readable storage medium (e.g., memory 106 of the wearable device 102). For example, the operations of method 1000 are performed, at least in part, by a communication module (e.g., communication module 218, FIG. 2), a signal generating module (e.g., signal generating module 222, FIG. 2), and/or a characteristics selection module (e.g., characteristics selection module 236, FIG. 2).

Specifically, the method 1000 is performed at a first wearable device that includes a first plurality of transducers (e.g., transducer array 110, FIG. 1), where each transducer (e.g., transducer 410, FIG. 4) generates one or more signals (e.g., waves 116, FIG. 1) that propagate away from the first wearable device through a medium. In some embodiments, the transducers are an array of miniature piezoelectric devices. Alternatively or in addition, in some embodiments, the transducers are an array of single or multipole voice coil motors (or various other transducers). In some embodiments, the one or more signals are mechanical waves, such as ultrasonic waves, soundwaves, or the like. In some other embodiments, the one or more signals are electromagnetic waves, or various other waves or signals. In some embodiments, the medium is skin (or flesh, bone, etc.) of a user wearing the wearable device. For example, the first wearable device may be attached to a wrist of the user, and the one or more signals may propagate away from the wearable device through the skin below the first wearable device (e.g., towards the user's finger and also towards the user's shoulder). In another example, the first wearable device is attached to some other part of the user's body (e.g., head, shoulder) or may be integrated with a head-mounted display 140 (FIG. 1).

In some embodiments, the plurality of transducers contacts the user's skin. In some embodiments, the wearable device further includes a band (e.g., wearable structure 402, FIG. 4; wearable structure 602, FIG. 6) to be secured around a wrist (or other body part) of the user, and each of the plurality of transducers is coupled to the band. In some embodiments, the plurality of transducers is radially spaced along a perimeter of the band (e.g., transducer arrangement shown in FIG. 6). In some embodiments, the wearable device includes a housing that houses the components of the wearable device. In some embodiments, the plurality of transducers is a plurality of electrodes (1018).

In performing the method 1000, the first wearable device (e.g., wearable device 102*a*) may receive (1002), via a radio (e.g., communications component 112, FIG. 2) or other transmitter/transceiver, an instruction from a host (e.g., computer system 130, FIGS. 1 and 3). Alternatively, in some embodiments, the first wearable device receives (1004) an input. For example, a user of the first wearable device may press a button of the first wearable device, which may trigger one or more steps of the method 1000 (e.g., one or more of steps 1012, 1016, and 1024). In some embodiments, the first wearable device is configured to receive (1006) one or more signals (e.g., sensor information module 226, FIG. 2) that are, e.g., transmitted by some other wearable device. In such embodiments, the one or more received signals may trigger one or more steps of the method 1000 (e.g., one or more of steps 1012, 1016, and 1024).

In some embodiments, the first wearable device is to be worn on the user's first appendage where the first appendage is the user's dominant appendage (e.g., the user is right-hand dominant and therefore the first wearable device is worn on the right wrist of the user) (1008). It is noted that the first wearable device may be worn instead on a non-dominant appendage. Additionally, at noted above, the first wearable device may be integrated with a head-mounted display 140, and thus, the first appendage is the user's head, neck, or shoulders.

Continuing, in performing the method 1000, the first wearable device may determine (1012) that the first appendage is in a transmitting position (e.g., a hand/arm posture that triggers generation of signals). In some embodiments, the transmitting position is one of a plurality of predetermined transmitting positions and corresponds to a hand pose of the first appendage (1014). The predetermined transmitting positions may be stored in memory of the first wearable device (e.g., device settings 228). Furthermore, the first wearable device may determine that the first appendage is in the transmitting position based, at least in part, on sensor data gathered by sensors (e.g., sensors 114, FIG. 2) of the first wearable device. For example, the transmitting position may correspond to a finger position, a wrist position, an ankle position, etc., and the sensor data may indicate that one of these positions has been taken by the first appendage. FIG. 7 shows one example of the user's appendage (e.g., the right arm) in a predetermined transmitting position (e.g., the user's hand is pointing, thereby triggering step 1016, discussed below).

In some embodiments of the method 1000, the first wearable device activates (1016) one or more transducers of the first plurality of transducers. In some embodiments, the first wearable device activates the one or more transducers in response to determining that the first appendage is in the transmitting position (1020). In some embodiment, the first wearable device activates the one or more transducers in response to receiving the instruction from the host (e.g., computer system 130) (1021). In some embodiments, the first wearable device activates the one or more transducers in response to receiving the input (1022). In other embodiments, the first wearable device activates the one or more transducers in response to determining that a predefined period of time has expired. For example, the first wearable device may activate the one or more transducers every x-number of seconds (e.g., every five seconds).

In response to activating (1016) the one or more transducers of the first plurality of transducers, the first wearable device generates (1024) signals (e.g., waves 116) that couple/vibrate into at least a portion of the first appendage of the user wearing the first wearable device. In some embodiments, the signals are transmitted through skin of the user (1026). Alternatively, the signals may be transmitted through bones of the user (1028) or through the first appendage of the user (1030). In some embodiments, the signals are ultrasonic waves (1032).

In performing the method 1000, a second wearable device (e.g., wearable device 102*b*), which is worn on a second appendage of the user, receives (1034) at least a portion of the signals generated by the first plurality of transducers of the first wearable device. In some embodiments, the second wearable device receives the portion of the signals regardless of the first appendage's proximity to the second appendage. For example, the signals generated by the first wearable device travel through the user's body, and as a result, the second wearable device receives at least a portion of those signals.

In addition, the second wearable device receives signals generated by the first plurality of transducers when the first appendage (e.g., the user's right arm, FIG. 7) of the user is within a threshold distance from the second wearable device. To provide some context, with reference to FIG. 7, the wearable device 102*a* on the user's left wrist receives signals generated (e.g., transmitted) by the wearable device 102*b* on the user's right wrist when the user's left wrist (or left hand) comes within a threshold distance from the second wearable device (or within a threshold distance from the second appendage). In some embodiments, the threshold distance corresponds to any portion of the first appendage. For example, the user may come within the threshold distance from the second wearable device based on a proximity of a finger tip of the first appendage to the second wearable device (or the second appendage).

In some embodiments, the threshold distance is a non-zero distance, meaning that the user comes within the threshold distance from the second wearable device when no contact is made between the first and second appendages (e.g., finger of the first appendage is hovering near a surface of the second appendage). Alternatively, in some embodiments, the threshold distance is zero, meaning that the user comes within the threshold distance from the second wearable device when contact is made between the first and second appendages (e.g., finger of the first appendage contacts a surface of the second appendage). The key here is that the second wearable device is able to distinguish between hover and touch events involving the first and second appendages.

In some embodiments, the second wearable device receives (1038) the portion of signals through at least a portion of the second appendage of the user. In some embodiments, the second wearable device is to be worn on the user's second appendage where the second appendage is the user's recessive appendage (1040).

In some embodiments, the second wearable device is also configured to generate (1036) different signals that couple/vibrate at least a portion of the second appendage of the user wearing the second wearable device (e.g., via signal generating module 222). In doing so, the first wearable device may receive the signals and process the signals in the manner discussed below.

In some embodiments, in response to the receiving at least the portion of the signals, the second wearable device provides (1044) data corresponding to the received portion of the signals to a computing device (e.g., computing system 130), and the computing device uses the data to determine a position of the first appendage with respect to a position of the second wearable device. In some embodiments, the data corresponding to the received portion of the signals (e.g., waves) transmitted by the first wearable device includes an indication that the position of the portion of the first appendage is a hand-hover proximate to the second wearable device (1046). In some embodiments, the data corresponding to the received portion of the signals (e.g., waves) transmitted by the first wearable device includes an indication that the position of the portion of the first appendage is a fingertip-hover proximate to the second wearable device (1048). In some embodiments, the data corresponding to the received portion of the signals transmitted by the first wearable device includes an indication that the position of the portion of the first appendage is in contact with skin of the user proximate to the second wearable device (1050). In some embodiments, the contact is a tap gesture 102 and/or a swipe gesture 1054. In some embodiments, a head-mounted display (e.g., HMD 140, FIG. 1), in communication with the computing device, uses the position of the first appendage to display at least the portion of the first appendage in virtual and/or augmented reality.

In some embodiments, the second wearable device is the computing system. In some embodiments, the computing system is distinct from the first and second wearable devices.

In some embodiments, the second wearable device determines a position of the first appendage with respect the second wearable device, instead of the computing device doing so. In such embodiments, the second wearable device sends (1042) a message to the computing device identifying the position of the portion of the first appendage. Again, a head-mounted display in communication with the remote device uses the information to display at least the portion of the first appendage in virtual and/or augmented reality.

Embodiments of the instant disclosure may include or be implemented in conjunction with various types of artificial reality systems. Artificial reality may constitute a form of reality that has been altered by virtual objects for presentation to a user. Such artificial reality may include and/or represent VR, AR, MR, hybrid reality, or some combination and/or variation of one or more of the same. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 1100 in FIG. 11. Other artificial reality systems may include an NED that also provides visibility into the real world (e.g., AR system 1200 in FIG. 12) or that visually immerses a user in an artificial reality (e.g., VR system 1300 in FIG. 13). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user (e.g., wearable device 102a, wearable device 102b, . . . wearable device 102n), devices worn by one or more other users, and/or any other suitable external system.

Figure 11:
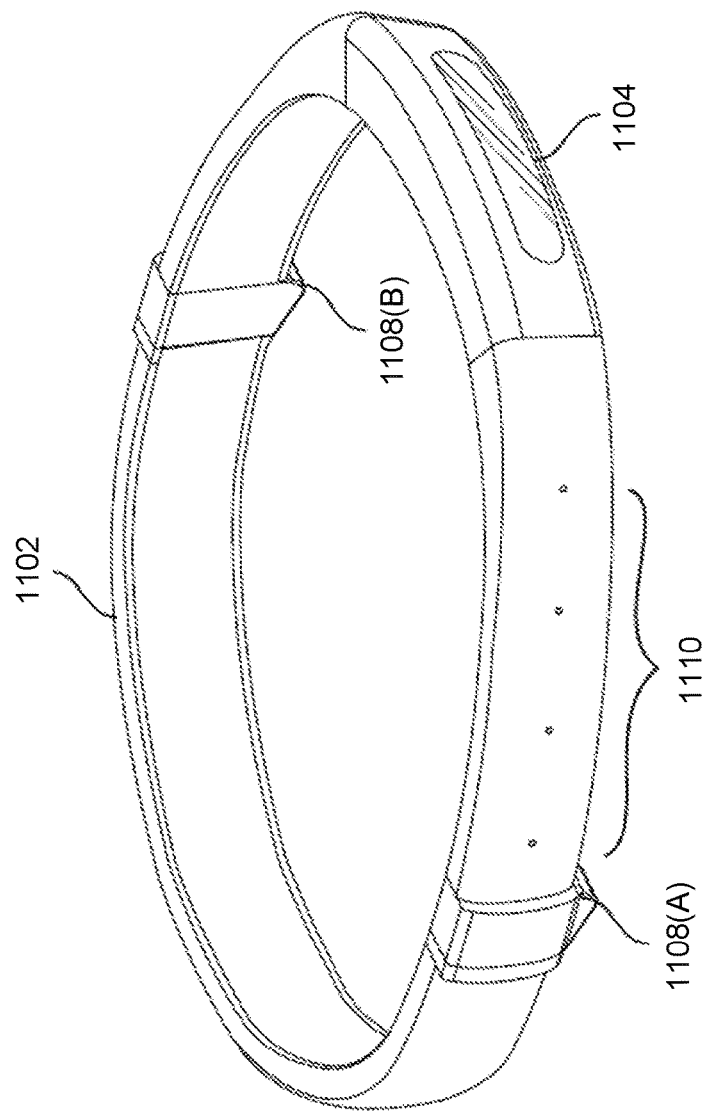
FIG. 11 illustrates an embodiment of an artificial reality device.

FIGS. 11-13 provide additional examples of the devices used in the system 100. AR system 1100 in FIG. 11 generally represents a wearable device dimensioned to fit about a body part (e.g., a head) of a user. The AR system 1100 may include the functionality of the wearable device 102, and may include additional functions. As shown, the AR system 1100 includes a frame 1102 (e.g., band) and a camera assembly 1104 that is coupled to frame 1102 and configured to gather information about a local environment by observing the local environment. The AR system 1100 may also include one or more transducers (e.g., instances of the transducers 410, FIG. 4). In one example, the AR system 1100 includes output transducers 1108(A) and 1108(B) and input transducers 1110. Output transducers 1108(A) and 1108(B) may provide audio feedback, haptic feedback, and/or content to a user, and input audio transducers may capture audio (or other signals/waves) in a user's environment. In some embodiments, the camera assembly 1104 includes one or more projectors (e.g., projectors 115) that allows the AR system 1100 to project images (e.g., if the AR system 1100 is worn on the user's wrist, then the camera assembly 1104 can project images onto the user's wrist and forearm).

Thus, the AR system 1100 does not include a near-eye display (NED) positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 1100 may not include an NED, the AR system 1100 may include other types of screens or visual feedback devices (e.g., a display screen integrated into a side of frame 1102).

The embodiments discussed in this disclosure may also be implemented in AR systems that include one or more NEDs. For example, as shown in FIG. 12, the AR system 1200 may include an eyewear device 1202 with a frame 1210 configured to hold a left display device 1215(A) and a right display device 1215(B) in front of a user's eyes. Display devices 1215(A) and 1215(B) may act together or independently to present an image or series of images to a user. While the AR system 1200 includes two displays, embodiments of this disclosure may be implemented in AR systems with a single NED or more than two NEDs.

In some embodiments, the AR system 1200 may include one or more sensors, such as sensor 1240. Sensor 1240 may generate measurement signals in response to motion of AR system 1200 and may be located on substantially any portion of frame 1210. Sensor 1240 may include a position sensor, an inertial measurement unit (IMU), a depth camera assembly, or any combination thereof. In some embodiments, the AR system 1200 may or may not include sensor 1240 or may include more than one sensor. In embodiments in which sensor 1240 includes an IMU, the IMU may generate calibration data based on measurement signals from sensor 1240. Examples of sensor 1240 may include, without limitation, accelerometers, gyroscopes, magnetometers, other suitable types of sensors that detect motion, sensors used for error correction of the IMU, or some combination thereof. Sensors are also discussed above with reference to FIG. 1 (e.g., sensors 145 of the head-mounted display 140).

The AR system 1200 may also include a microphone array with a plurality of acoustic sensors 1220(A)-1220(J), referred to collectively as acoustic sensors 1220. Acoustic sensors 1220 may be transducers that detect air pressure variations induced by sound waves. Each acoustic sensor 1220 may be configured to detect sound and convert the detected sound into an electronic format (e.g., an analog or digital format). The microphone array in FIG. 12 may include, for example, ten acoustic sensors: 1220(A) and 1220(B), which may be designed to be placed inside a corresponding ear of the user, acoustic sensors 1220(C), 1220(D), 1220(E), 1220(F), 1220(G), and 1220(H), which may be positioned at various locations on frame 1210, and/or acoustic sensors 1220(I) and 1220(J), which may be positioned on a corresponding neckband 1205. In some embodiments, the neckband 1205 is an example of the computer system 130.

The configuration of acoustic sensors 1220 of the microphone array may vary. While the AR system 1200 is shown in FIG. 12 as having ten acoustic sensors 1220, the number of acoustic sensors 1220 may be greater or less than ten. In some embodiments, using higher numbers of acoustic sensors 1220 may increase the amount of audio information collected and/or the sensitivity and accuracy of the audio information. In contrast, using a lower number of acoustic sensors 1220 may decrease the computing power required by a controller 1250 to process the collected audio information. In addition, the position of each acoustic sensor 1220 of the microphone array may vary. For example, the position of an acoustic sensor 1220 may include a defined position on the user, a defined coordinate on the frame 1210, an orientation associated with each acoustic sensor, or some combination thereof.

Acoustic sensors 1220(A) and 1220(B) may be positioned on different parts of the user's ear, such as behind the pinna or within the auricle or fossa. Or, there may be additional acoustic sensors on or surrounding the ear in addition to acoustic sensors 1220 inside the ear canal. Having an acoustic sensor positioned next to an ear canal of a user may enable the microphone array to collect information on how sounds arrive at the ear canal. By positioning at least two of acoustic sensors 1220 on either side of a user's head (e.g., as binaural microphones), the AR device 1200 may simulate binaural hearing and capture a 3D stereo sound field around about a user's head. In some embodiments, the acoustic sensors 1220(A) and 1220(B) may be connected to the AR system 1200 via a wired connection, and in other embodiments, the acoustic sensors 1220(A) and 1220(B) may be connected to the AR system 1200 via a wireless connection (e.g., a Bluetooth connection). In still other embodiments, acoustic sensors 1220(A) and 1220(B) may not be used at all in conjunction with the AR system 1200.

Acoustic sensors 1220 on frame 1210 may be positioned along the length of the temples, across the bridge, above or below display devices 1215(A) and 1215(B), or some combination thereof. Acoustic sensors 1220 may be oriented such that the microphone array is able to detect sounds in a wide range of directions surrounding the user wearing AR system 1200. In some embodiments, an optimization process may be performed during manufacturing of AR system 1200 to determine relative positioning of each acoustic sensor 1220 in the microphone array.

The AR system 1200 may further include or be connected to an external device (e.g., a paired device), such as neckband 1205. As shown, neckband 1205 may be coupled to eyewear device 1202 via one or more connectors 1230. Connectors 1230 may be wired or wireless connectors and may include electrical and/or non-electrical (e.g., structural) components. In some cases, eyewear device 1202 and neckband 1205 may operate independently without any wired or wireless connection between them. While FIG. 12 illustrates the components of eyewear device 1202 and neckband 1205 in example locations on eyewear device 1202 and neckband 1205, the components may be located elsewhere and/or distributed differently on eyewear device 1202 and/or neckband 1205. In some embodiments, the components of eyewear device 1202 and neckband 1205 may be located on one or more additional peripheral devices paired with eyewear device 1202, neckband 1205, or some combination thereof. Furthermore, neckband 1205 generally represents any type or form of paired device. Thus, the following discussion of neckband 1205 may also apply to various other paired devices, such as smart watches, smart phones, wrist bands, other wearable devices, hand-held controllers, tablet computers, laptop computers, etc.

Pairing external devices, such as neckband 1205, with AR eyewear devices may enable the eyewear devices to achieve the form factor of a pair of glasses while still providing sufficient battery and computation power for expanded capabilities. Some or all of the battery power, computational resources, and/or additional features of the AR system 1200 may be provided by a paired device or shared between a paired device and an eyewear device, thus reducing the weight, heat profile, and form factor of the eyewear device overall while still retaining desired functionality. For example, neckband 1205 may allow components that would otherwise be included on an eyewear device to be included in neckband 1205 since users may tolerate a heavier weight load on their shoulders than they would tolerate on their heads. Neckband 1205 may also have a larger surface area over which to diffuse and disperse heat to the ambient environment. Thus, neckband 1205 may allow for greater battery and computation capacity than might otherwise have been possible on a stand-alone eyewear device. Since weight carried in neckband 1205 may be less invasive to a user than weight carried in eyewear device 1202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 1205 may be communicatively coupled with eyewear device 1202 and/or to other devices. The other devices may provide certain functions (e.g., tracking, localizing, depth mapping, processing, storage, etc.) to the AR system 1200. In the embodiment of FIG. 12, neckband 1205 may include two acoustic sensors (e.g., 1220(I) and 1220(J)) that are part of the microphone array (or potentially form their own microphone subarray). Neckband 1205 may also include a controller 1225 and a power source 1235.

Acoustic sensors 1220(I) and 1220(J) of neckband 1205 may be configured to detect sound and convert the detected sound into an electronic format (analog or digital). In the embodiment of FIG. 12, acoustic sensors 1220(I) and 1220(J) may be positioned on neckband 1205, thereby increasing the distance between neckband acoustic sensors 1220(I) and 1220(J) and other acoustic sensors 1220 positioned on eyewear device 1202. In some cases, increasing the distance between acoustic sensors 1220 of the microphone array may improve the accuracy of beamforming performed via the microphone array. For example, if a sound is detected by acoustic sensors 1220(C) and 1220(D) and the distance between acoustic sensors 1220(C) and 1220(D) is greater than, e.g., the distance between acoustic sensors 1220(D) and 1220(E), the determined source location of the detected sound may be more accurate than if the sound had been detected by acoustic sensors 1220(D) and 1220(E).

Controller 1225 of neckband 1205 may process information generated by the sensors on neckband 1205 and/or AR system 1200. For example, controller 1225 may process information from the microphone array that describes sounds detected by the microphone array. For each detected sound, controller 1225 may perform a direction of arrival (DOA) estimation to estimate a direction from which the detected sound arrived at the microphone array. As the microphone array detects sounds, controller 1225 may populate an audio data set with the information. In embodiments in which AR system 1200 includes an IMU, controller 1225 may compute all inertial and spatial calculations from the IMU located on eyewear device 1202. Connector 1230 may convey information between AR system 1200 and neckband 1205 and between AR system 1200 and controller 1225. The information may be in the form of optical data, electrical data, wireless data, or any other transmittable data form. Moving the processing of information generated by AR system 1200 to neckband 1205 may reduce weight and heat in eyewear device 1202, making it more comfortable to a user.

Power source 1235 in neckband 1205 may provide power to eyewear device 1202 and/or to neckband 1205. Power source 1235 may include, without limitation, lithium-ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial reality systems may, instead of blending an artificial reality with actual reality, substantially replace one or more of a user's sensory perceptions of the real world with a virtual experience. One example of this type of system is a head-worn display system, such as VR system 1300 in FIG. 13, that mostly or completely covers a user's field of view. VR system 1300 may include a front rigid body 1302 and a band 1304 shaped to fit around a user's head. VR system 1300 may also include output audio transducers 1306(A) and 1306(B). Furthermore, while not shown in FIG. 13, front rigid body 1302 may include one or more electronic elements, including one or more electronic displays, one or more IMUS, one or more tracking emitters or detectors, and/or any other suitable device or system for creating an artificial reality experience. Although not shown, the VR system 1300 may include the computer system 130.

Artificial reality systems may include a variety of types of visual feedback mechanisms. For example, display devices in AR system 1200 and/or VR system 1300 may include one or more liquid-crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 1200 and/or VR system 1300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 1100, AR system 1200, and/or VR system 1300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 11 and 13, output audio transducers 1108(A), 1108(B), 1106(A), and 1306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1110 may include condenser microphones, dynamic microphones, ribbon microphones, and/or any other type or form of input transducer. In some embodiments, a single transducer may be used for both audio input and audio output.

The artificial reality systems shown in FIGS. 11-13 may include tactile (i.e., haptic) feedback systems, which may be incorporated into headwear, gloves, body suits, handheld controllers, environmental devices (e.g., chairs, floormats, etc.), and/or any other type of device or system, such as the wearable devices 102 discussed herein. Additionally, in some embodiments, the haptic feedback systems may be incorporated with the artificial reality systems (e.g., the AR system 1100 may include the wearable device 102 (FIG. 1). Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, vision aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios including WiFi, Bluetooth, global positioning system (GPS), cellular or other communication devices may also be used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 1100, 1200, and 1300) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a DOA analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

It is noted that the embodiments disclosed herein can also be combined with any of the embodiments described in U.S. Provisional Application No. 62/647,560, filed Mar. 23, 2018, entitled "Methods, Devices, and Systems for Projecting an Image Onto a User and Detecting Touch Gestures."

It also is noted that the embodiments disclosed herein can also be combined with any of the embodiments described in U.S. Utility patent application Ser. No. 16/241,893, entitled "Methods, Devices, and Systems for Displaying a User Interface on a User and Detecting Touch Gestures," filed Jan. 7, 2019.

What is claimed is:

1. A method, comprising:
at a first wearable device comprising a first plurality of transducers that can each generate one or more signals and a control circuit coupled to the plurality of transducers:
activating, via the control circuit, one or more of the first plurality of transducers; and
generating, via the first plurality of transducers, signals that couple into at least a portion of a first appendage of a user wearing the first wearable device; and
at a second wearable device distinct from the first wearable device, the second wearable device comprising a second plurality of transducers:
receiving, via the second plurality of transducers, at least a portion of the signals generated by the first plurality of transducers when the first appendage of the user is within a threshold distance from the second wearable device, wherein the user is wearing the second wearable device on a second appendage different from the first appendage; and
in response to the receiving,
providing data corresponding to the received portion of the signals to a computing device, wherein the computing device uses the data to determine a position of the first appendage with respect to a position of the second wearable device.

2. The method of claim 1, further comprising, at the second wearable device:
generating, via the second plurality of transducers, different signals that vibrate at least a portion of the second appendage of the user wearing the second wearable device.

3. The method of claim 1, wherein the plurality of transducers is a plurality of electrodes.

4. The method of claim 1, wherein the signals are transmitted through the skin of the user or the bones of the user.

5. The method of claim 1, wherein the portion of signals received by the second plurality of transducers is received through at least a portion of the second appendage of the user.

6. The method of claim 1, wherein the first wearable device is also configured to receive one or more signals.

7. The method of claim 1, wherein the signals are ultrasonic waves.

8. The method of claim 1, wherein:
the first wearable is to be worn on the user's first appendage, the first appendage being the user's dominant appendage, and
the second wearable is to be worn on the user's second appendage, the second appendage being the user's recessive appendage.

9. The method of claim 1, wherein the data corresponding to the received portion of the signals includes an indication that the position of the portion of the first appendage is a hand-hover proximate to the second wearable device.

10. The method of claim 1, wherein the data corresponding to the received portion of the signals includes an indication that the position of the portion of the first appendage is a fingertip-hover proximate to the second wearable device.

11. The method of claim 1, wherein the data corresponding to the received portion of the signals includes an indication that the position of the user includes an indication that the user is in contact with skin of the user proximate to the second wearable device.

12. The method of claim 1, wherein:
the method further comprises receiving, via a radio of the first wearable device, an instruction from the computing device; and
activating the one or more transducers of the first plurality of transducers is performed in response to receiving the instruction.

13. The method of claim 1, wherein:
the method further comprises determining that the first appendage is in a transmitting position; and
activating the one or more transducers of the first plurality of transducers is performed in response to determining that the first appendage is in the transmitting position.

14. The method of claim 13, wherein the transmitting position is one of a plurality of predetermined transmitting positions and corresponds to a pose of the first appendage.

15. The method of claim 1, wherein:
the method further comprises receiving an input at the first wearable device; and
activating the one or more transducers of the first plurality of transducers is performed in response to receiving the input.

16. The method of claim 1, wherein:
a head-mounted display is in communication with the computing device; and
the head-mounted display uses the position of the first appendage to display at least the portion of the first appendage in virtual and/or augmented reality.

17. The method of claim 1, wherein the first wearable device is a transmitter of one or more signals and the second wearable device is a receiver of the one or more signals.

18. The method of claim 1, wherein the second wearable device is the computing system.

19. A system, comprising: a first wearable device comprising a first plurality of transducers that can each generate one or more signals and a control circuit coupled to the plurality of transducers, the first wearable device being configured to: activate one or more of the first plurality of transducers; and generate signals that couple into at least a portion of a first appendage of a user wearing the first wearable device; and a second wearable device, distinct from the first wearable device, comprising a second plurality of transducers, the second wearable device being configured to: receive at least a portion of the signals generated by the first plurality of transducers when the first appendage of the user is within a threshold distance from the second wearable device, wherein the user is wearing the second wearable device on a second appendage different from the first appendage; and in response to the receiving, providing data corresponding to the received portion of the waves to a computing device, wherein the computing device uses the data to determine a position of the first appendage with respect to a position of the second wearable device.

20. A non-transitory computer-readable storage medium, storing one or more programs configured for execution by one or more processors of a first wearable device and a second wearable device, the one or more programs including instructions, which when executed by the one or more processors cause the first and second wearable devices to:
at the first wearable device comprising a first plurality of transducers that can each generate one or more signals and a control circuit coupled to the plurality of transducers:
activating, via the control circuit, one or more of the first plurality of transducers; and
generating, via the first plurality of transducers, signals that couple into at least a portion of a first appendage of a user wearing the first wearable device; and
at the second wearable device distinct from the first wearable device, the second wearable device comprising a second plurality of transducers:
receiving, via the second plurality of transducers, at least a portion of the signals generated by the first plurality of transducers when the first appendage of the user is within a threshold distance from the second wearable device, wherein the user is wearing the second wearable device on a second appendage different from the first appendage; and
in response to the receiving, providing data corresponding to the received portion of the signals to a computing device, wherein the computing device uses the data to determine a position of the first appendage with respect to a position of the second wearable device.

* * * * *